United States Patent

Slichter

[15] 3,667,035

[45] May 30, 1972

[54] NUCLEAR MAGNETISM LOGGING

[72] Inventor: Charles P. Slichter, Champaign, Ill.

[73] Assignee: Texaco Development Corporation, New York, N.Y.

[22] Filed: Mar. 17, 1970

[21] Appl. No.: 20,207

[52] U.S. Cl. ........................................................324/0.5 R
[51] Int. Cl. ...........................................................G01n 27/78
[58] Field of Search..............324/0.5 A, 0.5 AC, 0.5 G, 0.5 R

[56] References Cited

UNITED STATES PATENTS

| 3,483,465 | 12/1969 | Baker | 324/0.5 |
|---|---|---|---|
| 3,398,355 | 8/1968 | Barringer | 324/0.5 |
| 3,297,860 | 1/1967 | Weiss | 324/0.5 |
| 3,479,579 | 11/1969 | Baker | 324/0.5 |
| 3,275,931 | 9/1966 | Collins | 324/0.5 |

OTHER PUBLICATIONS

D. C. Ailion and C. P. Slichter–Observation of Ultra–Slow Translational Diffusion in Metallic Lithium by Magnetic Resonace–Phys. Rev.– 137(1A)–1/4/65–pp. A235– A245

*Primary Examiner*—Michael J. Lynch
*Attorney*—Thomas H. Whaley, Carl G. Ries and Robert J. Sanders, Jr.

[57] ABSTRACT

Method and apparatus for analyzing earth materials in situ along a bore hole on the basis of their nuclear magnetic properties. A logging instrument is passed through the bore hole with means to subject a region including earth material in situ to a relatively strong D.C. magnetic field, which may be oriented in any direction and which may be relatively inhomogeneous, for polarizing susceptible nuclei in said material, including selected nuclei therein. The logging instrument also contains means for applying an alternating magnetic field to the same region, including polarized nuclei therein, in a direction transverse to the earth's magnetic field and at a frequency corresponding to the Larmor precession frequency of the selected nuclei in the earth's field. While the alternating field is being applied, the D.C. polarizing field in the region including said material is terminated within a predetermined time interval, i.e., turned off sufficiently slowly to provide an adiabatic variation of the D.C. field and sufficiently quickly to terminate the D.C. field within a time interval less than the characteristic thermal relaxation time of the selected nuclei. Since the frequency of the alternating field is such that it produces resonance in the earth's field alone, turning off the polarizing field sweeps the nuclei onto driven resonance. The alternating field is then abruptly terminated in said region including said polarized nuclei so that the selected polarized nuclei precess freely about the earth's relatively homogeneous magnetic field. A characteristic of the resulting free precession condition of the selected nuclei is detected. In accordance with a preferred embodiment, the free precession condition is detected by phase coherent detection utilizing a reference signal produced in timed correlation with the alternating field. Advantageously, in accordance with a further feature of the invention, computer of average transient signal averaging techniques, such as the type known as boxcar integration (digital or analogue), are employed for enhancement of the detected free precession signal with respect to the noise.

28 Claims, 61 Drawing Figures

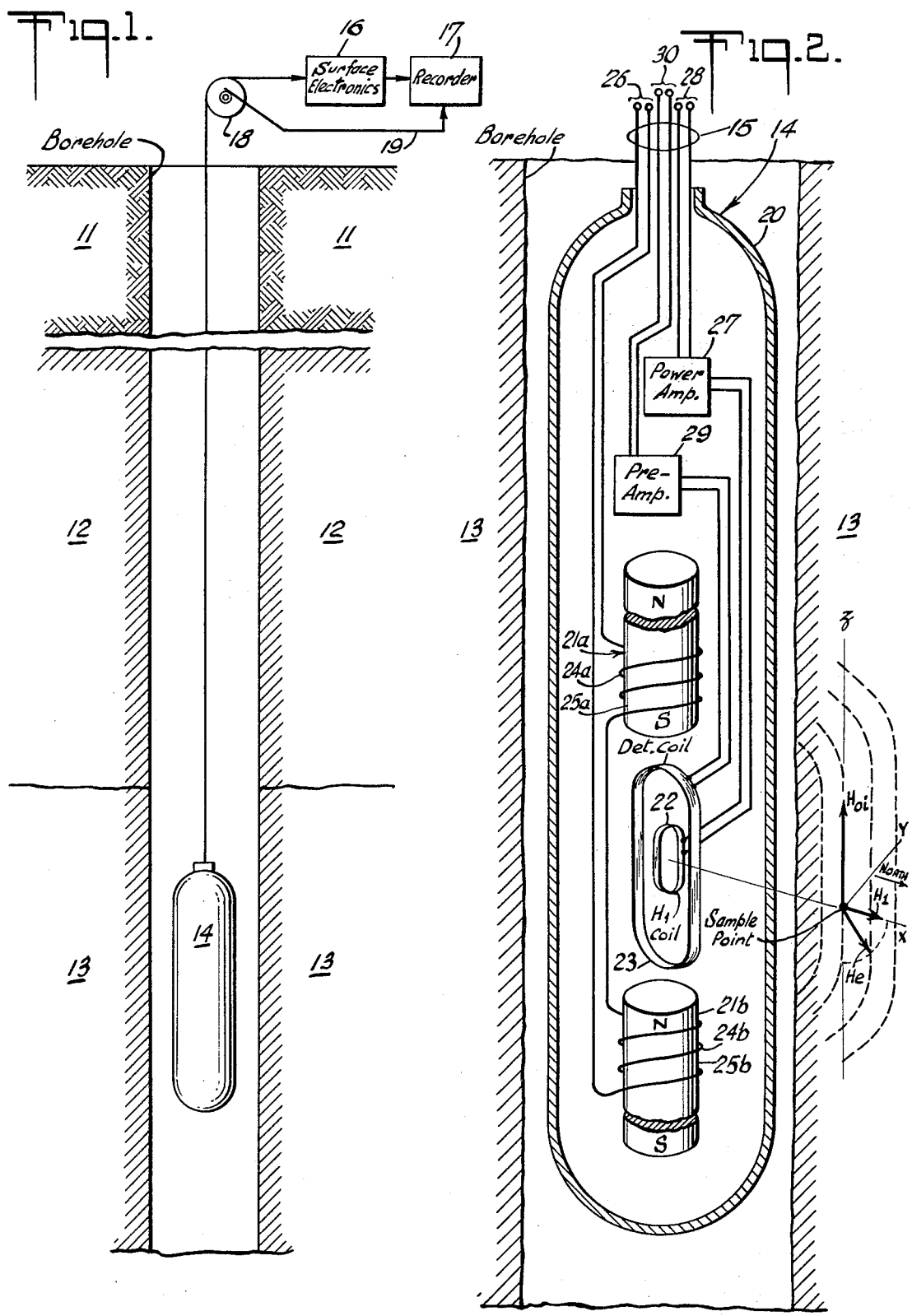

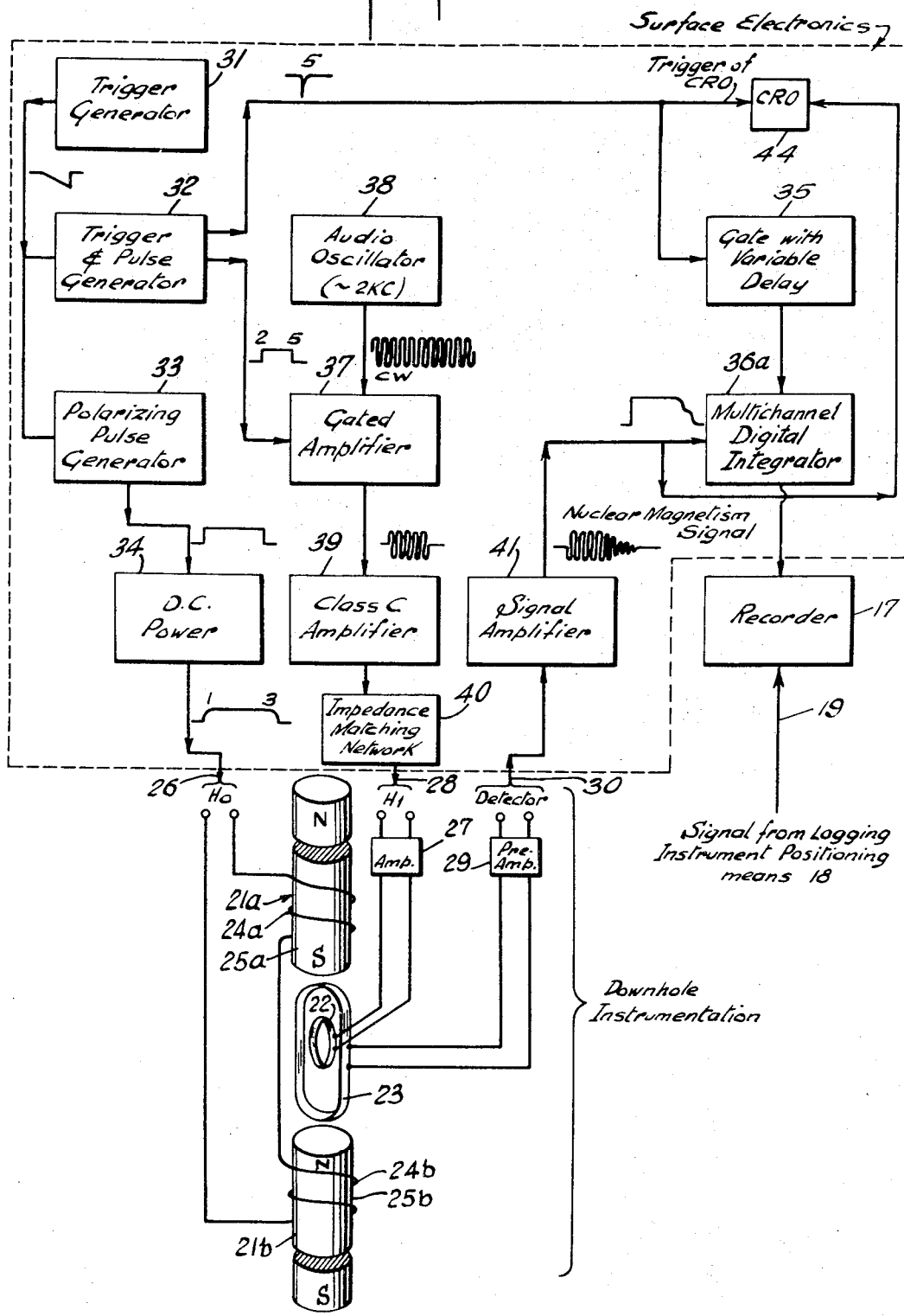

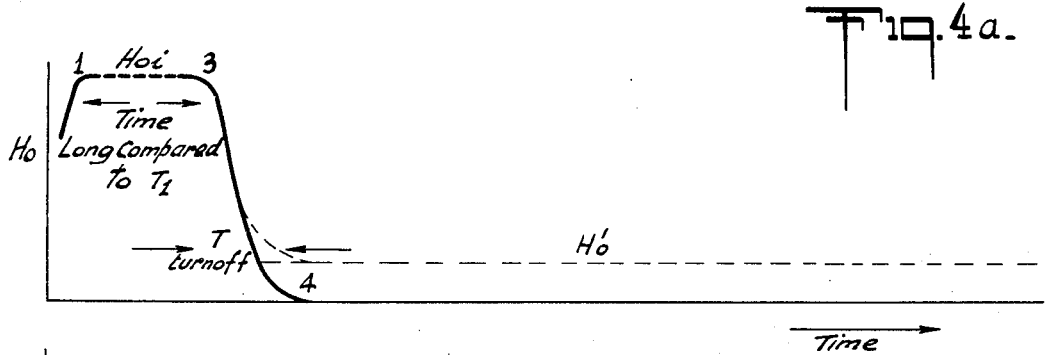
Fig.4a.
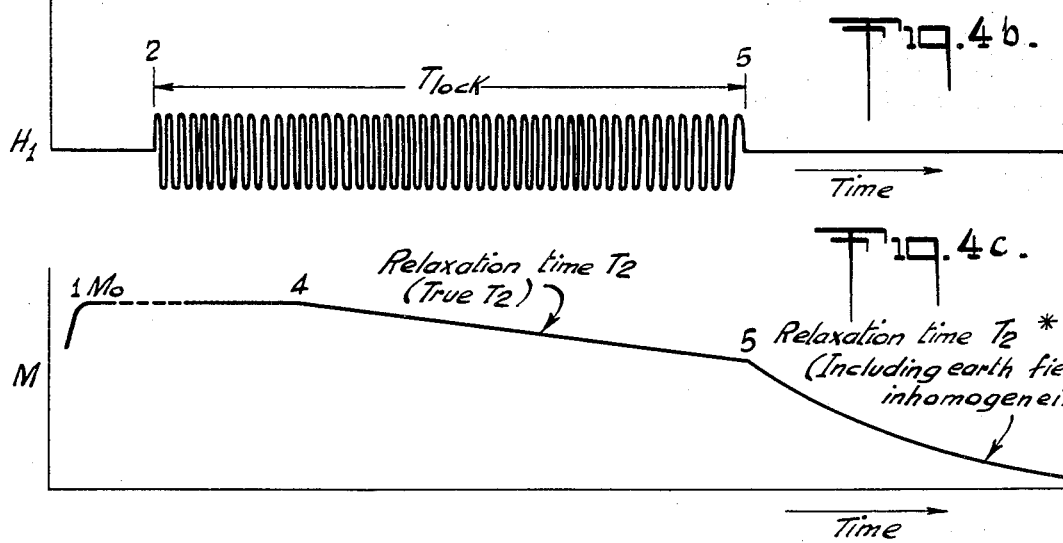
Fig.4b.
Fig.4c.
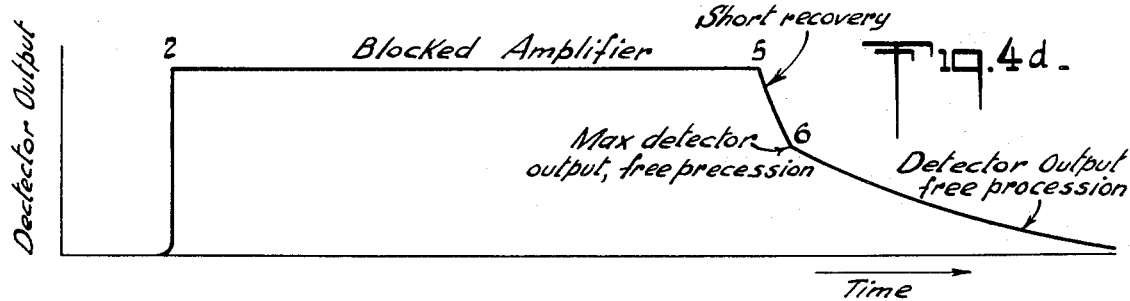
Fig.4d.
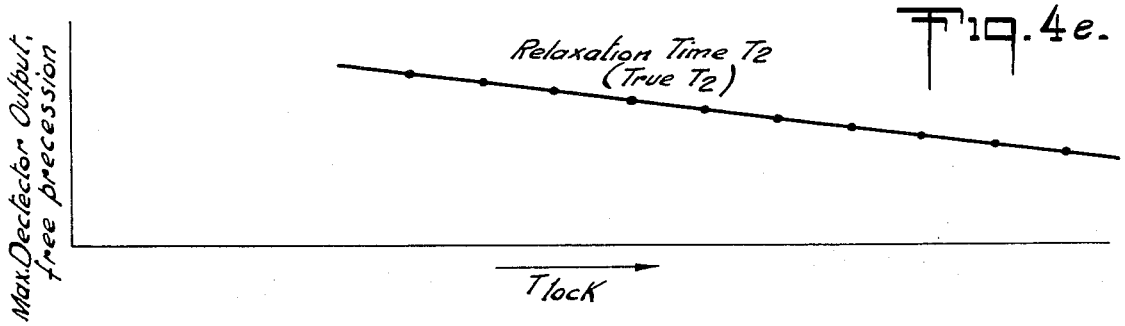
Fig.4e.

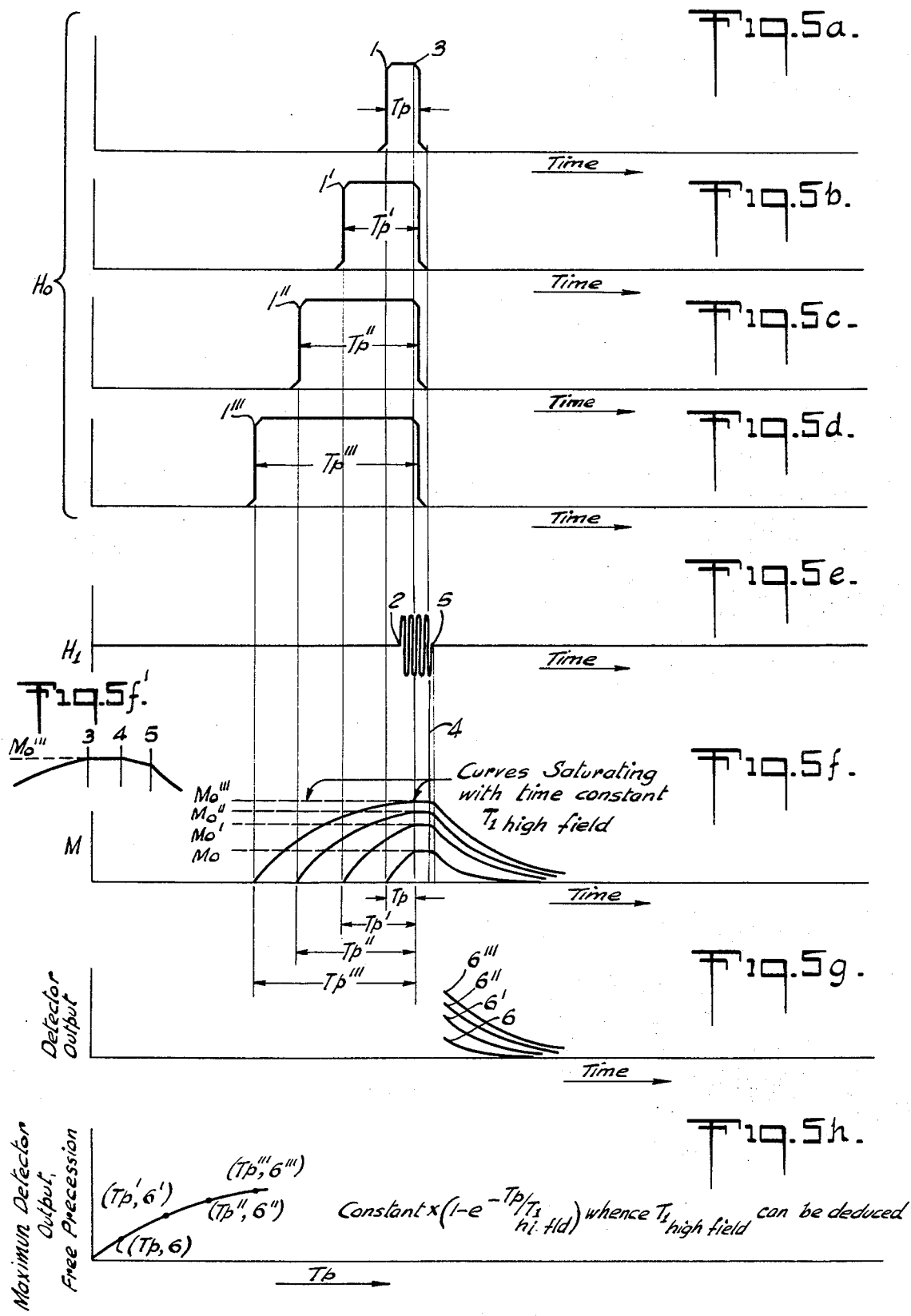

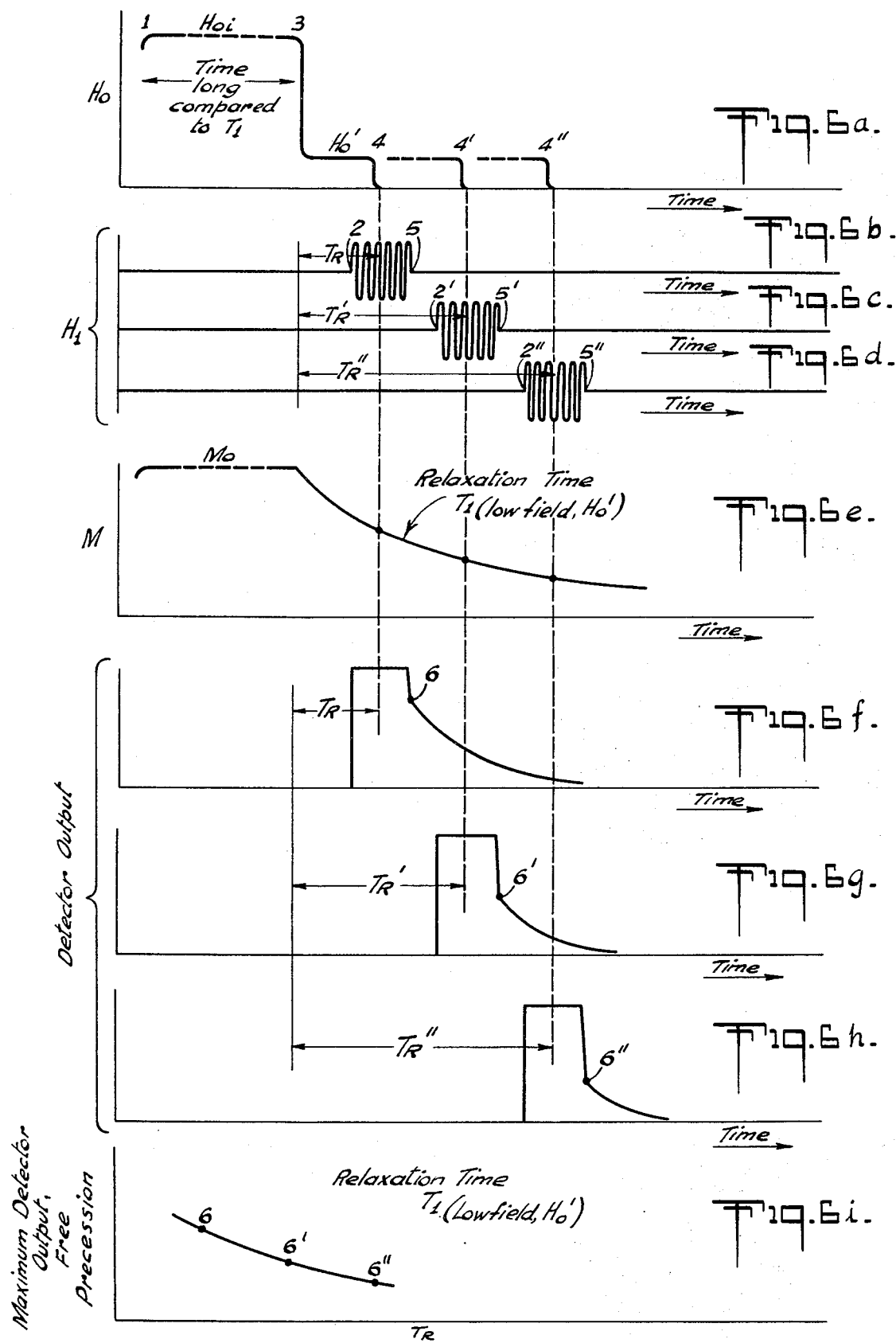

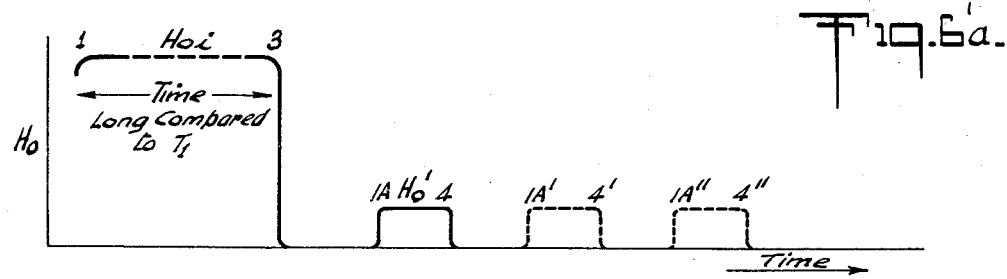
Fig. 6a.
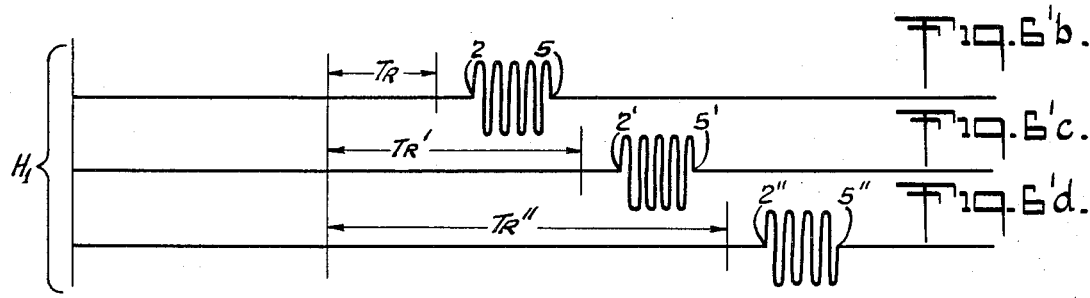
Fig. 6b.
Fig. 6c.
Fig. 6d.
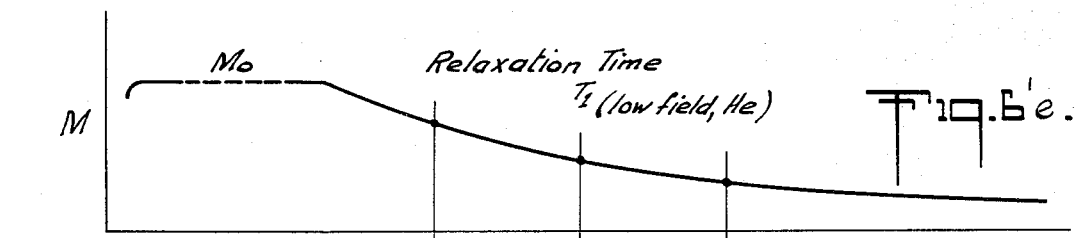
Fig. 6e.
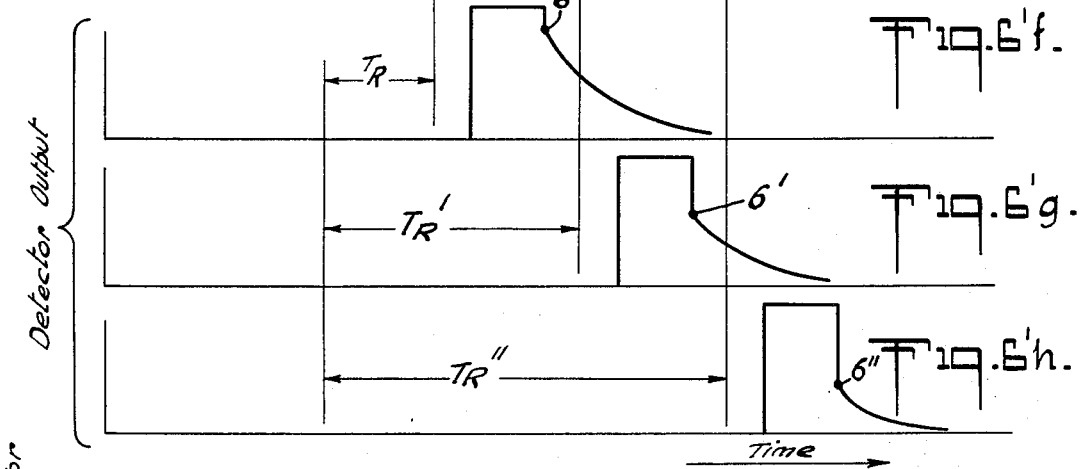
Fig. 6f.
Fig. 6g.
Fig. 6h.
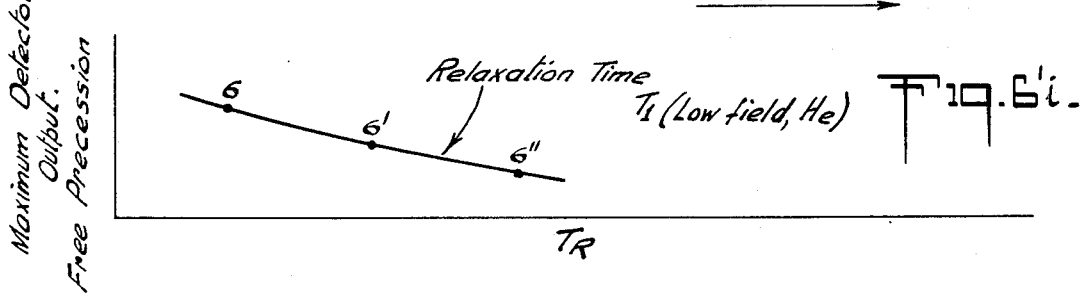
Fig. 6i.

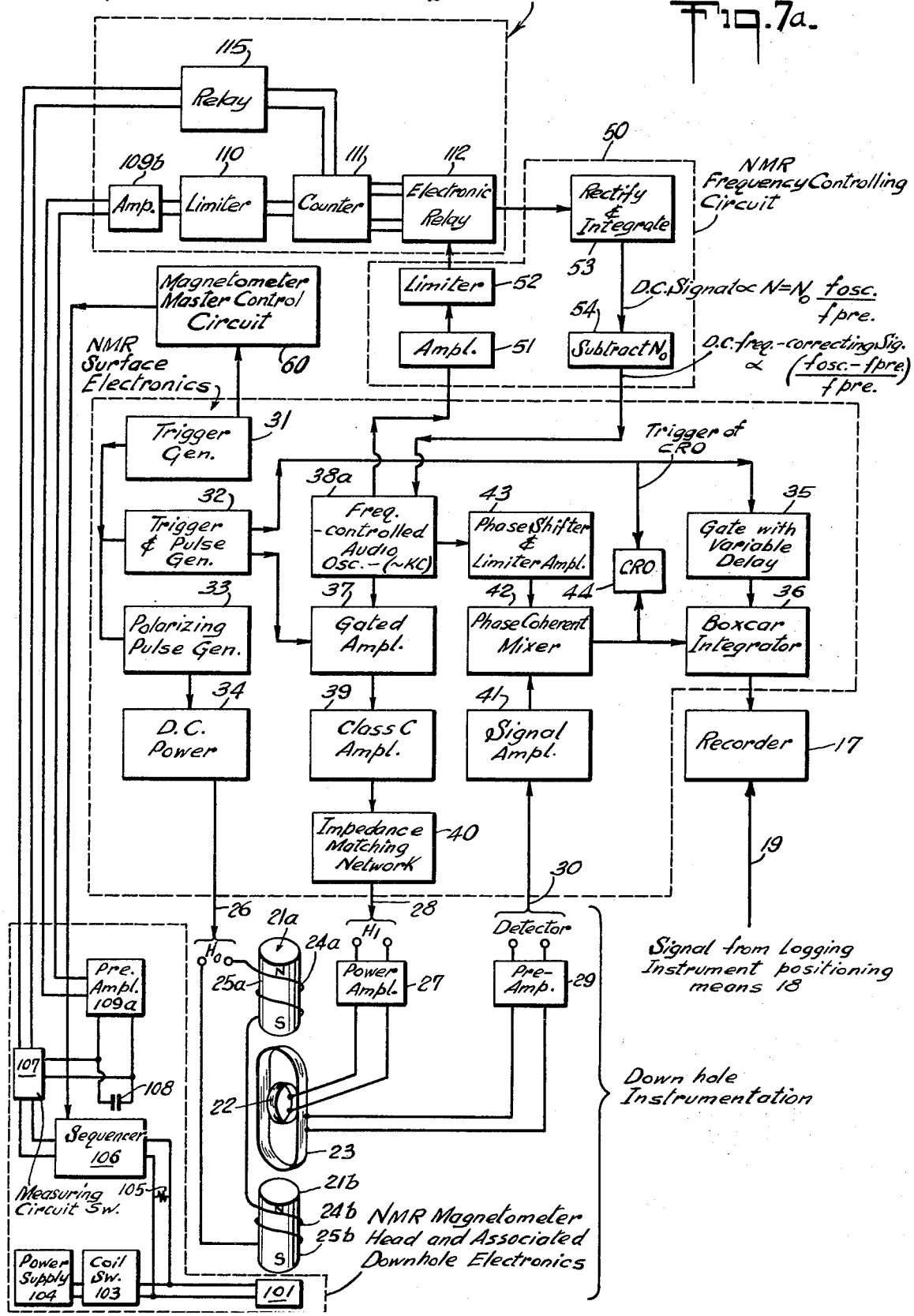

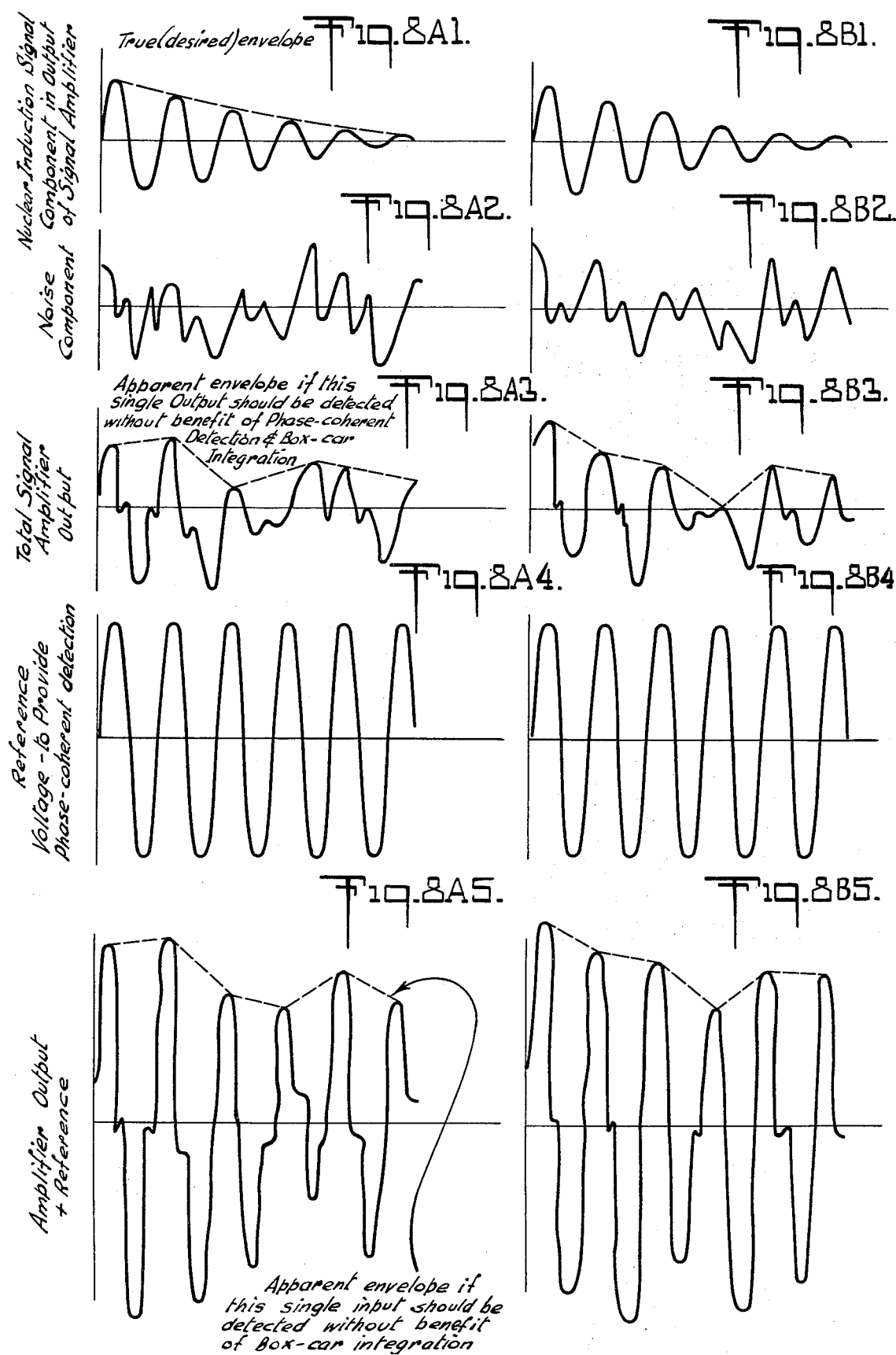

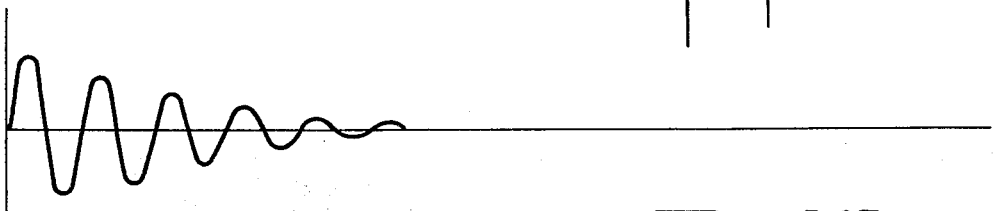
Fig. 8C1.
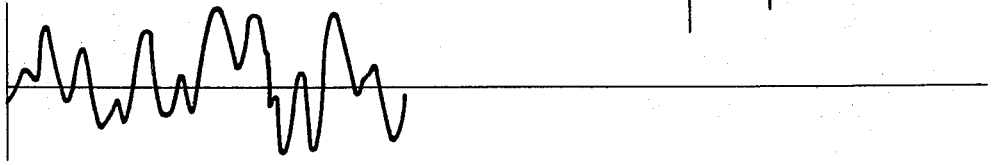
Fig. 8C2.
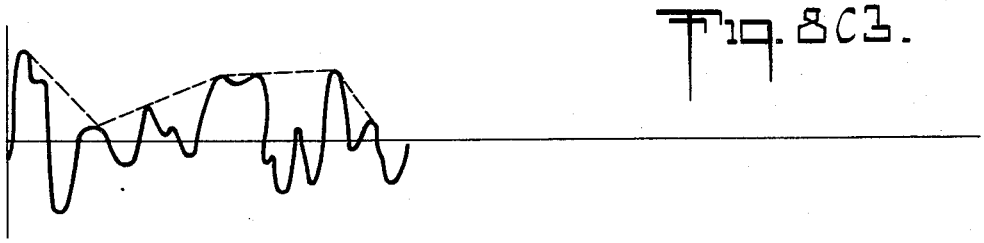
Fig. 8C3.
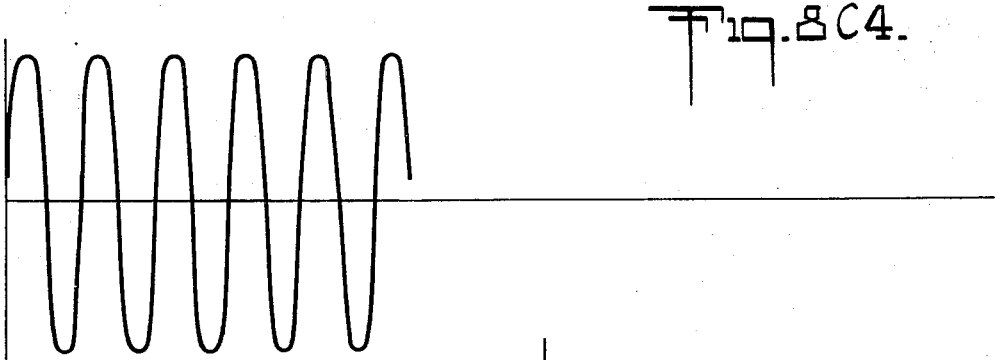
Fig. 8C4.
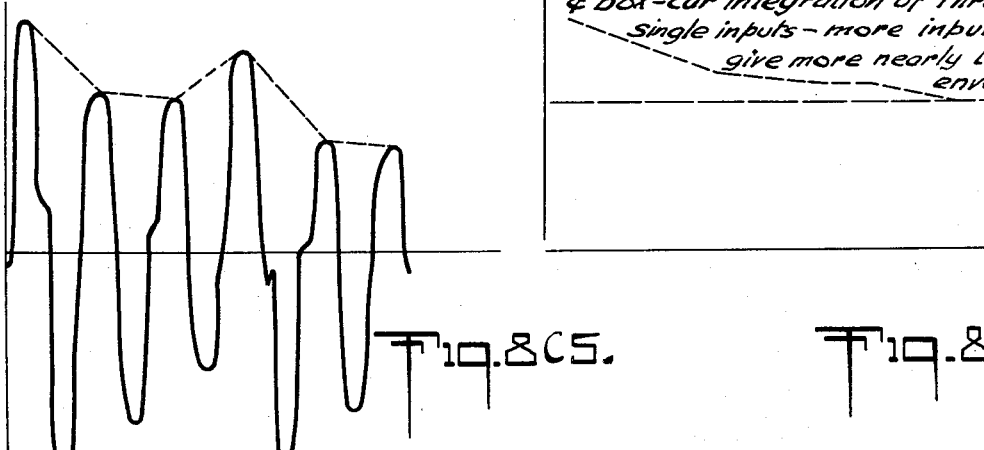
Fig. 8C5.
Fig. 8D.
Apparent envelope after Combined phase coherent detection & box-car integration of three single inputs - more inputs give more nearly true envelope

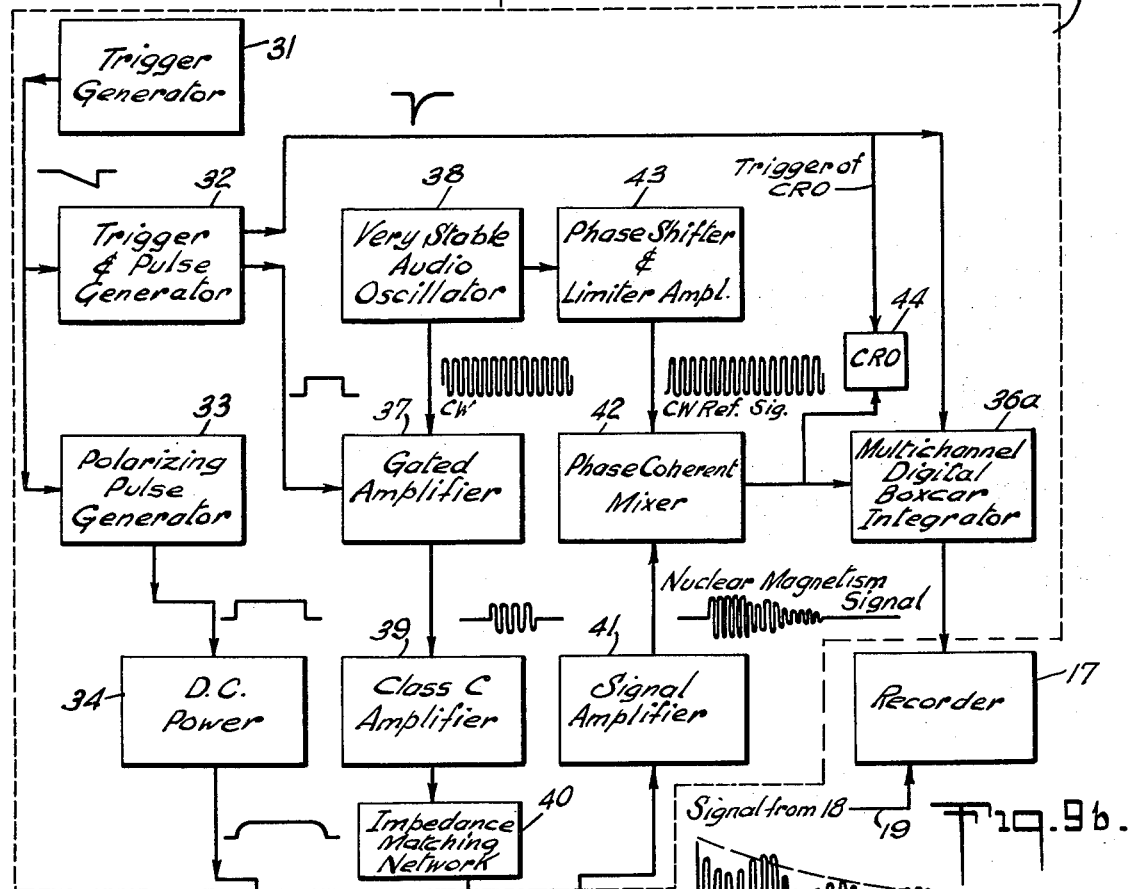
Fig. 9a.
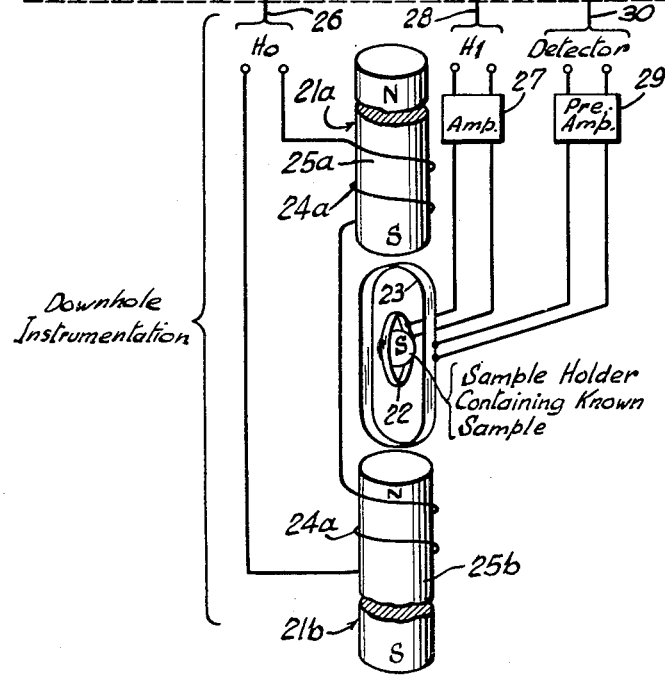
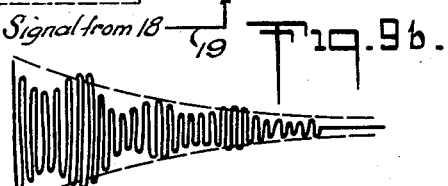
Fig. 9b.
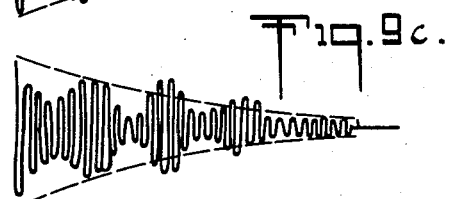
Fig. 9c.
Fig. 9d.
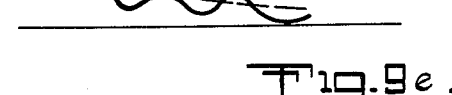
Fig. 9e.
Fig. 9f.

3,667,035

NUCLEAR MAGNETISM LOGGING

This invention relates to nuclear magnetism well logging of earth formations in situ along a bore hold; and, more particularly, is related to improvements in nuclear magnetic resonance well logging techniques involving the making of such measurements utilizing the earth's magnetic field.

Methods and apparatus have been proposed heretofore for conducting magnetic resonance logging operations along an earth bore hole to analyze the constituents of material comprising earth formations in situ. One such proposal involves so-called forced precession techniques using a logging instrument containing means for subjecting the earth formations to a relatively strong D.C. polarizing magnetic field and a transverse RF alternating magnetic field at the Larmor precession frequency of selected polarized nuclei to cause such nuclei to precess about the D.C. field so that the appropriate magnetic resonance condition may be produced in the formation where selected nuclei having requisite magnetic properties may be present. The resultant magnetic resonance condition of the sample is then detected by observing the energy absorbed from the RF coil used to produce the transverse field or by utilizing a separate detector coil for measuring the condition of magnetic resonance. A problem associated with such so-called forced precession techniques is that they require large magnets to provide relatively homogeneous D.C. fields in which the magnetic resonance condition is observed.

Since it is desirable to conduct magnetic resonance analysis in the presence of a relatively homogeneous D.C. magnetic field, it has been proposed to conduct magnetic resonance well logs using techniques for causing selected polarized nuclei to precess about the earth's magnetic field. In accordance with these techniques, selected nuclei under investigation are polarized, usually by the application of a pulsed unidirectional magnetic field which is substantially perpendicular to the earth's magnetic field and is turned off rapidly, rather than adiabatically, whereby the nuclei are caused to precess about the earth's field at the Larmor frequency. This requires that the condition of resonance be initiated in a relatively weak field, e.g., the earth's field.

These measurements may involve free induction techniques or other techniques suitable for measuring the magnetic resonance condition of a sample containing nuclei with the requisite magnetic characteristics. In this respect, for example, see U.S. Pats. Nos. 3,135,912, 3,213,354, 3,213,356, 3,213,357 and 3,226,632.

Among disadvantages of such prior techniques using the earth's magnetic field are 1) that the requirement to turn the polarizing field off quickly limits the strength of the polarizing field and thus the signal strength, and 2) that they result in relatively weak signals relative to noise, which signals, if rectified, do not lend themselves to the use of signal averaging techniques of signal enhancement.

The present invention is directed toward improvements in magnetic resonance well logging featuring advantages found in the so-called forced precession techniques and which, nevertheless, utilizes the relatively homogeneous earth's magnetic field in which to make the desired magnetic resonance measurement. Since the polarizing field can be turned off relatively slowly, a stronger polarizing field can be utilized. Embodiments of this invention also involve the use of improved signal detection and enhancement techniques for obtaining improvements in signal to noise ratios.

SUMMARY OF THE INVENTION

Briefly stated, one aspect of the present invention involves method and apparatus for analyzing materials in situ in the earth along a bore hole on the basis of their nuclear magnetic properties. A region of the earth including material in situ is subjected to a relatively strong D.C. magnetic field for polarizing susceptible nuclei, including selected nuclei which may be present in said material. An alternating magnetic field is applied to the same region including said material in a direction transverse to the earth's magnetic field and at a frequency corresponding to the Larmor precession frequency of the selected nuclei in the earth's field. Prior to termination of the alternating field, the polarizing field in the region including said material is terminated adiabatically within a predetermined time interval less than the characteristic thermal relaxation time of the selected nuclei, thereby sweeping onto the condition of driven resonance for selected nuclei in the earth's field. The alternating field is then abruptly terminated in said region leaving the selected polarized nuclei precessing freely about the earth's field. A signal characteristic of the resulting free precession condition of the selected nuclei is detected. Preferably, in accordance with a further embodiment, the alternating field is correlated with a source of oscillations employed to generate a reference signal for phase coherent detection of the free precession signal, and signal averaging techniques may also be used to achieve enhancement of the signal to noise ratio of the detected free precession signal.

The features of the invention which are believed to be novel are pointed out in the appended claims.

BRIEF DESCRIPTION OF THE DRAWINGS

In the drawings:

FIG. 1 is a side elevational view, partly in cross section, showing schematically a portion of a borehole in the earth and a logging system including an instrument suspended in the borehole for conducting a well log of the material comprising the earth formations along the borehole in accordance with principles of the invention;

FIG. 2 is a side elevational view showing an enlarged, cross-sectional view of the logging instrument illustrated in FIG. 1;

FIG. 3a is a schematic representation, partly in block form, showing in detail similar to that of FIG. 3 an alternate embodiment of the surface electronics for the logging system of FIG. 1;

FIGS. 4a through 4e are plot vs. time of various aspects of the magnetic fields and signals involved in the carrying out of magnetic resonance analysis according to the present invention;

FIGS. 5a through 5h are further plots vs. time of various aspects of the magnetic fields and signals involved in the carrying out of magnetic resonance analysis according to the present invention, with FIG. 5f being an enlarged detailed illustration of a portion of FIG. 5f showing the characteristic shape of the curve $M_o'''$, which is typical of the shape of curves $M_o$ through $M_o'''$;

FIGS. 6a through 6i are still further plots vs. time of various aspects of the magnetic fields and signals involved in carrying out magnetic resonance analysis for measuring $T_1$ (low field) according to the present invention;

FIGS. 6'a through 6'i are still further plots vs. time, similar to FIG. 6a through 6i, illustrating various aspects of the magnetic fields and signals for measuring $T_1$ (low field) in accordance with the invention in the limiting case of $H_o'$ equals 0, i.e., in the earth's field.

FIG. 7a is a schematic representation, partly in block form, showing another embodiment of the invention illustrated in FIG. 3;

FIG. 7c is a plot vs. time showing the wave form of the detector output of the apparatus illustrated in FIG. 7a;

FIGS. 8a through 8d are plots vs. time illustrating various aspects of the signal, noise and reference components related to the phase-coherent detection and box-car integration system illustrated in FIGS. 3 and 7a;

FIG. 9a is a side elevational view, partly in block form, showing a further embodiment of the apparatus illustrated in FIG. 3, suitable for use as a NMR magnetometer; and, FIGS. 9b through 9f are plots vs. time illustrating the wave form of nuclear magnetism signals provided by the apparatus of FIG. 9a.

DETAILED DESCRIPTION OF THE INVENTION

Figure 3:
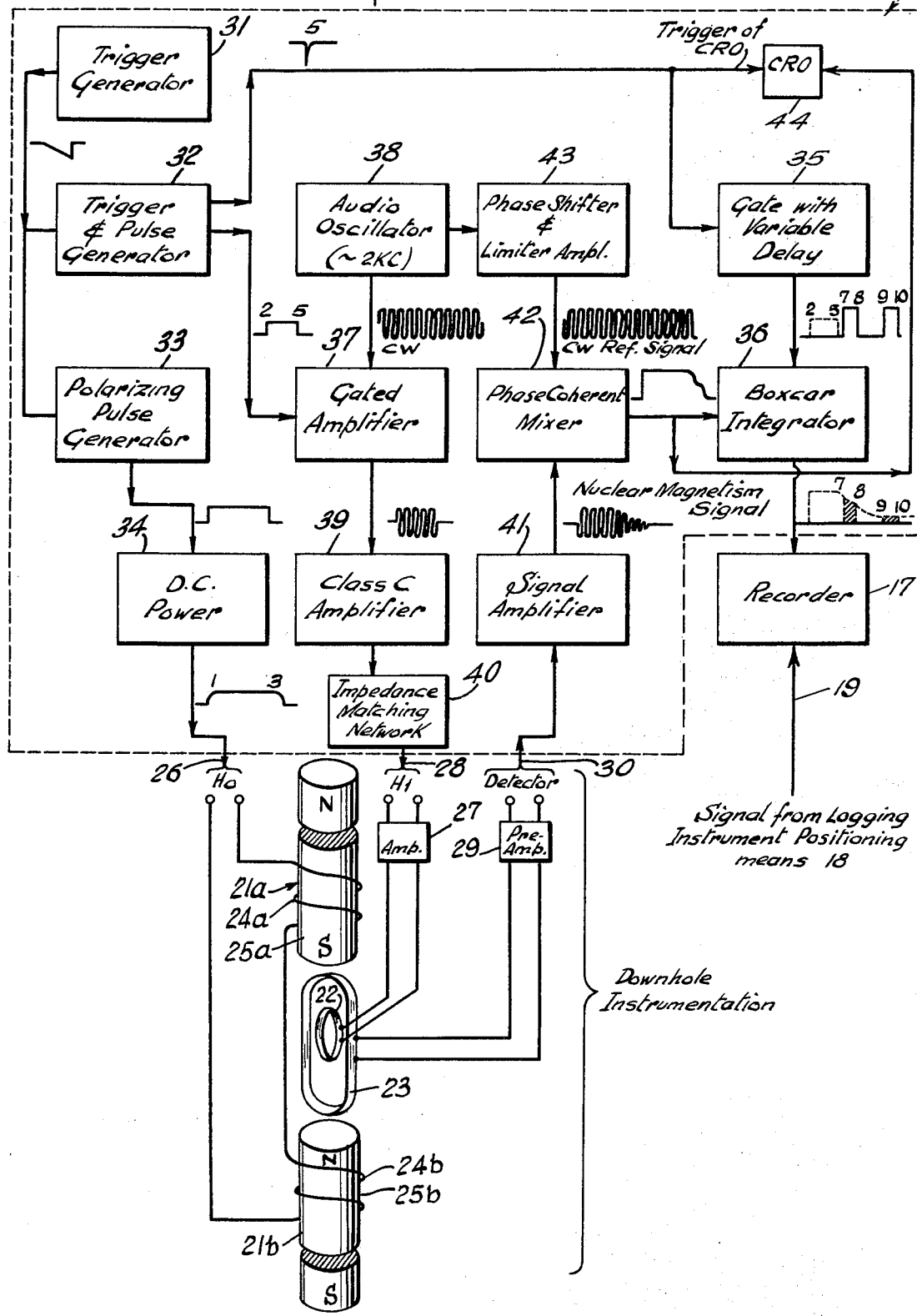
FIG. 3 is a schematic representation, partly in block form, showing in further detail the surface electronics of the logging system of FIG. 1 and further illustrated schematically the circuitry of the instrument of FIGS. 1 and 2.

Apparatus in accordance with the invention is shown in FIG. 1 adjacent a borehole traversing a plurality of earth formations 11, 12, 13 about which analytical information is desired. Within the borehole there is shown a logging instrument 14 suspended by means of a cable 15 which also serves to provide a plurality of electrical circuit paths between the instrument 14 and electrical equipment at the urface of the earth adjacent the borehole, shown schematically as surface electronics 16 and recorder 17. Positioning means for raising and lowering the logging instrument 14 by means of the cable 15 is shown schematically as a sheave 18, it being understood that the positioning means includes well known equipment such as a drum (not shown) for reeling the cable and a winch (not shown) for raising and lowering the cable 15 as desired. The positioning means further includes means for generating a signal indicative of the amount of cable 15 paid out into the borehole, therefore showing the depth position of the logging instrument 14 in the borehole at various times during a well log. The signal indicative of the position of the logging instrument, which may be derived from a selsyn or the like in known manner, is shown coupled by means of a suitable electrical connection 19 to the recorder 17 so that a continuous record may be made of the position of the logging instrument 14 in correlation with logging signals coupled from the surface electronics 16 to the recorder 17.

The logging instrument 14 operates in conjunction with the surface electronics 16 and the recorder 17 to provide signals indicative of certain nuclear magnetic properties of material comprising the earth formations 11, 12, 13 along the traverse of the borehole.

The details of the logging instrument 14 may be better appreciated by reference to FIG. 2 wherein the instrument 14 is shown to comprise an outer shell or housing 20 containing apparatus for producing the desired magnetic fields required to produce the condition of nuclear magnetic precession in selected nuclei adjacent the borehole as well as means for detecting a condition of nuclear magnetic precession thus produced in the material adjacent the borehole.

It is to be understood that the housing 20 of the logging instrument 14 may be formed of any material suitable to provide the desired mechanical and structural integrity under the conditions encountered in earth boreholes to be logged, without unduly interfering with the magnetic fields involved in producing and detecting the desired condition of magnetic precession in the formations adjacent the borehole. For example, the housing may be formed of aluminum.

The logging apparatus within the housing 20 includes means for producing a relatively strong D.C. magnetic field $H_o$ in the region adjacent the logging instrument 14, shown schematically as an electro-magnet formed of two separate axially aligned portions 21a and 21b spaced from one another to provide a gap within which is positioned means shown as an A.F. coil 22 for producing an alternating magnetic field $H_1$ having a substantial component in a direction transverse to the earth's magnetic field $H_e$ in the adjacent formations at a frequency corresponding to the Larmor precession frequency of the selected nuclei in the earth's field $H_e$. Within the housing 20 there is also provided a detector coil 23 oriented with its axis in a direction transverse to that of the A. F. coil 22, and substantially perpendicular to the earth's field $H_e$, employed for detecting a condition of magnetic precession produced in the selected nuclei adjacent the logging instrument 14, in a manner to be described hereinafter.

The electromagnet 21a, 21b is formed of two axially aligned spaced coil portions 24a and 24b each of which is wound on a respective core 25a, 25b which is capable of being magnetized when an appropriate electric current is supplied to the coils 24a, 24b from the surface electronics by means of the conductive circuit path 26 of the cable 15. The coils 24a and 24b are wound in corresponding directions, so that the poles of the respective magnet portions 21a and 21b are in corresponding orientation (i.e.) with the north pole of one adjacent the south pole of the other. Advantageously, the cores 25a, 25b may be of laminated material to facilitate rapid switching of the D.C. field $H_o$ in response to correspondingly rapid current pulses applied thereto over the D.C. current supply circuit path 26.

The A. F. $H_1$ coil 22 is supplied with appropriate alternating current at the Larmor frequency of the selected nuclei in the earth's magnetic field $H_e$ from a power amplifier 27 in the logging instrument 14 which, in turn, is supplied from the surface electronics 16 over the conductors 28 of the cable 15. The output of the detector coil 23 is connected to a preamp 29 for transmission of signals derived by the coil 23 over the appropriate conductive path 30 in the cable 15 to the surface electronics 16.

The directions of the magnetic fields $H_o$ and $H_1$ generated by the logging instrument 14 in an adjacent earth formation and of the earth's field $H_e$ are represented by the vector diagram in FIG. 2. $H_{oi}$ represents the initial value of $H_o$. This diagram will be better appreciated upon consideration of the method of operation of the logging instrument described hereinafter.

In FIG. 3 the surface electronics 16 is shown within the dashed box as comprising a trigger generator 31 which serves as a master clock or timing source for generating appropriate timing pulses such as the saw-toothed trigger pulse shown graphically at the output thereof and which is coupled to the respective inputs of both a trigger and pulse generator 32 and a polarizing pulse generator 33. The polarizing pulse generator 33 provides an output signal in the form of a square wave of predetermined duration, as shown, for controlling the output of a D.C. power source 34 coupled thereto which, in turn, provides output current over the circuit path 26 in the logging cable 15 to the coils 24a and 24b of the D.C. magnetic field producing electro magnet 21a, 21b in the logging instrument 14 only during predetermined successive time intervals for operation of the logging system as described herein.

The trigger and pulse generator 32 operates to provide two separate outputs, the first of which is a trigger pulse, as shown, which is supplied simultaneously to both the trigger of an oscilloscope, identified as C R O 44, and to a gate with variable delay circuit 35 which, in turn, is coupled to a Boxcar integrator 36 which is part of the signal detection equipment which, in turn, is connected to the recorder 19.

The second signal output path from the trigger and pulse generator 32 provides a square wave gating signal, as shown, which is coupled to the input of a gated amplifier 37 which, in turn, serves to control the output of an audio oscillator 38, shown as a 2KC oscillator having its output continuously fed to the gated amplifier 37 which serves, in effect, as an electronic switch to gate the output of the audio oscillator 38 in accordance with the square wave trigger pulse supplied to the gated amplifier 37, with the result that the gated amplifier 37 provides an output in the form of bursts of the audio oscillator output frequency, the duration and time separation of which are determined by the square wave gate signal from the trigger pulse generator 32. The output of the gated amplifier 37 is supplied to a class C amplifier 39 which, in turn, has its output coupled through an impedance matching network 40 to the signal transmission path 28 of the cable 15 which, in turn, is coupled to the amplifier 27 for supplying the prescribed A.C. current to the magnetic field producing coil 22 in the logging instrument 14.

It will be seen from the above that the supply of current to the D.C. polarizing magnet of the logging instrument and the supply of A.C. current to the A.F. coil 22 of the logging instrument 14, are both dependent upon gating signals provided by the trigger generator 31, which controls the Polarizing Pulse Generator 33 which, in turn, determines the operating schedule of the polarizing D.C. magnet 21a, 21b. Trigger generator 31 also controls the trigger and pulse generator 32 for determining the operating schedule of the A.C. field producing coil 22, so that the operating schedules of the polarizing magnet and the A.C. field producing coil are coordinated in a manner to be described hereinafter. In addition to the above, it is seen that the operation of the signal detection system is also correlated by the trigger generator 31 and the trigger and pulse generator 32.

The detector coil 23 is coupled through the preamp 29 to the transmission path 30 in the cable 15, thence to a signal amplifier 41 in the surface electronics 16, the output of which is supplied to a phase coherent mixer 42 (also known as a phase coherent detector) along with a CW reference signal, as shown, which is derived through a phase shifter and limiter amplifier 43 from the audio oscillator 38. The mixer contains circuit elements to filter the output to give a pass-band at the difference frequency between the outputs of circuits 41 and 43 and to eliminate the sum frequency. Thus, the reference signal supplied to the phase coherent detector 42 is provided in the desired frequency and phase relationship with the A.F. or A.C. field produced by the coil 22 and applied to the material of an earth formation adjacent the instrument 14.

The output of the phase coherent mixer 42 is coupled to a signal display device, shown as a cathode ray oscilloscope 44, which serves to provide a means for monitoring the operation of the system and for both visual and photographic observation of the signals displayed therein. The output of the phase coherent mixer 42 is also shown supplied to a signal enchancement system, shown as a boxcar integrator 36, which is operated in appropriate phase relationship with the precessing nuclei detected by the coil 23 as determined by the trigger pulse supplied thereto from the trigger and pulse generator 32 through the gate with variable delay circuit 35, which provides gating pulses of appropriately timed duration and spacing as shown. The output of the boxcar integrator 36, the operation of which will be described in detail hereinafter, is supplied to the recorder 17 which includes means for recording the detected nuclear magnetic resonance signal in correlation with a signal supplied over the circuit path 19 from the positioning means 18 showing the position of the logging instrument in the borehole where each nuclear precession measurement is made.

The apparatus illustrated in FIGS. 1 through 3 may be employed to conduct a log of the earth formations along a borehole by moving the instrument continuously at an appropriate logging speed through the borehole during the logging operation or by stopping the logging instrument at selected levels along the borehole as the logging signal is obtained.

The technique for conducting a log of the earth formations along a borehole may be better appreciated by reference to FIG. 2 wherein there is illustrated the orientations of the electro-magnet 21a, 21b, for producing the polarizing field $H_o$ and of the coil 22 for producing the transverse alternating magnetic field $H_1$, as well as the orientation of the detector coil 23 in the logging instrument, shown at right angles to the $H_1$ coil 22. Adjacent the logging instrument 14 there is shown a vector diagram of the magnetic fields of interest, wherein the X direction represents magnetic north, Y is magnetic west and the earth's field $H_e$, at each sample point in the formation, is assumed to have a dip angle of 60°, which is a representative value for much of the oil country in the United States of America. The desired strong polarizing field $H_o$ is created with a substantial component perpendicular to the earth's field $H_e$ at the sample point in the formation by the D.C. polarizing magnet 21 a, 21b, as represented by the $H_{oi}$ vector vertically directed at the sample point. The alternating field $H_1$ is produced with a substantial component perpendicular to the earth's field $H_e$ at the sample point by the $H_1$ coil which is substantially coplanar with the $H_o$ polarizing magnet 21a, 21b. The detector coil 23 is oriented perpendicular to the $H_1$ coil 22 with its axis along the Y direction so that as the magnetic polarization M at the sample point rotates with a significant component in a plane perpendicular to the earth's field $H_e$, the lines of magnetic flux cut the detector coil 23 and induce a signal therein. The detector coil 23 is vertically elongated to provide greater effective length for cutting lines of flux. The D.C. polarizing magnet 21a, 21b provides a magnetic flux at the sample point with an $H_o$ vector directed vertically.

Although the symbol $H_1$ has heretofore been used herein largely as a name for the alternating magnetic field, it will be understood by those skilled in the art that in all instances hereafter where the quantitative value of the alternating magnetic field is clearly intended (e.g. in formulas containing $H_1$) it is intended that $H_1$ shall mean the magnitude of the component of the alternating magnetic field which is perpendicular to the unidirectional field about which precession takes place, which usually herein is the earth's field, $H_e$.

The present invention involves a method of magnetic resonance analysis in the earth's field $H_e$ by achieving the condition of magnetic resonance through the steps of (1) polarizing the sample with a strong field $H_o$ in some direction having a substantial component at right angles to the earth's field $H_e$ (e.g. the Z direction); (2) applying in a direction having a substantial component at right angles to the earth's field $H_e$ (e.g. the X direction) an alternating magnetic field $H_1$ at the resonance frequency $\gamma H_e/2\pi$, and (3) turning off the polarizing field $H_o$ adiabatically in a time $T_{turn\text{-}off}$ given by the relationship:

$T_1 > T_{turn\text{-}off} > 1/\gamma H_1$; where $T_1$ is the thermal or spin-lattice relaxation time and $H_1$ is the strength of the alternating magnetic field at the sample. Typical values for protons in oil are: $T_1 = 100$ msec, $H_1 \cong 5.0$ oersteds, and $1/\gamma H_1 = 0.05$ msec.

Under these circumstances the polarizing field $H_o$ changes from a large value, $H_{oi}$ in the Z direction to a smaller value $H_{of} = H_e$, in the direction of $H_e$, and the magnetic polarization M precesses about the direction of the polarizing field $H_o$ all the while as it changes from $H_{oi}$ to $H_{of} = H_e$, ending in a condition of precession at the resonance frequency about the direction of the homogenous earth's field $H_e$. This precessing condition can then be observed by means of the detector coil 23 so oriented that lines of magnetic flux emanating from the precessing polarization M cut the turns of the detector coil, e.g. by virtue of the detector coil orientation having its turns lying in the X–Z plane. The detector coil need not have its center at the origin of the XYZ axis although this would be preferable, if possible.

Applicant recognizes that although the above-described approach to magnetic resonance about the earth's field $H_e$ should ideally have the direction of $H_{oi}$, $H_1$, and $H_e$ mutually perpendicular, such is not essential and in general is not practical. The mutually perpendicular condition is worthy for consideration for purposes of simplicity of illustration and understanding. In general, $H_{oi}$ may be in any direction with respect to $H_e$, and $H_1$ need only have a component perpendicular to $H_e$, although the more nearly perpendicular the better. The detector coil is preferably oriented with its axis in a plane perpendicular to $H_e$; thus the detector coil may be the same coil as that which produces the $H_1$ field or a separate coil as is well known in nuclear magnetic resonance apparatus of the crossed-coil type, i.e., with axis not only perpendicular (or substantially perpendicular) to $H_e$, but also perpendicular to the axis of the $H_1$ coil, and as is shown in the embodiments FIGS. 2 and 3.

In order to clarify the relationship between the various factors in the approach to magnetic resonance, according to the present invention, it is helpful to view these factors from a point of view within a rotating frame of reference, rotating at the frequency of the rotating magnetic field $H_1$. Thus instead of viewing them from the fixed frame of reference designated by the coordinates $x$, $y$ $z$, we shall assume that we are located in, and viewing from, the rotating frame of reference designated by the coordinates $x_R$, $y_R$, $z_R$. Now let us assume further that the rotating frame has the same origin as the fixed frame, and also that $z_R$ is aligned along $z$, and therefore that the $x_R y_R$ plane is identical with the $xy$ plane. Also we shall choose the direction of $x_R$ to be the same as the direction of $H_1$. Under these conditions it will be seen that all can now be represented in a 2-dimensional picture, since all factors lie in the $x_R z$ plane, which itself rotates as seen in the fixed frame of reference. It will be remembered that in order to visualize what is actually happening in the fixed frame of reference one must restore the effect of rotation about the $z$ axis.

When viewing the essential factors in the rotating frame of reference one finds that there is an effective field vector $H_{eff}$, which is the vector sum of a first vector, $H_1$, and a second vector whose value is obtained thus: $H_0$ diminished by the value $H_{of}$ which $H_0$ has at resonance. Thus $H_{eff}$ is a vector having magnitude $[(H_0 - H_{of})^2 + H_1^2]^{1/2}$, and having direction given by $\theta = $ arc tan $(H_1/H_0 - H_{of})$. The derivation of these relationships is given in Principles of Magnetic Resonance, by C. P. Slichter, Harper and Row (1963), page 19. Now the magnetic polarization M lines up with $H_{eff}$, and continues to stay lined up with it assuming sufficient time is allowed after each infinitesimal change in $\theta$ to permit realignment. Therefore, starting with field $H_1$ rotating at a constant frequency and with $H_{oi}$ somewhat greater than $H_{of}$, we approach magnetic resonance. Graphically this is simply done by laying out $H_1$ along the $x_R$ axis, then $H_0 - H_{of}$ along the $z$ axis, taking the vector sum graphically to get $H_{eff}$, and then laying out the magnetic polarization M along the direction of $H_{eff}$. Note that for the magnetic resonance condition, with $\theta = 90°$, and $H_{eff} = H_1$, the magnetic polarization M would be found to be rotating in the $xy$ plane if we return to viewing in the fixed frame of reference.

"Adiabatic Variation" of $H_o$ permits M to follow $H_{eff}$

In the preceding paragraph an important assumption is made at one point; it is indicated by the underlined words: "assuming sufficient time is allowed after each infinitesimal change in $\theta$ to permit realignment." As shown in the above cited book by C. P. Slichter, pp. 21–22, this assumption is valid whenever the angular rate of turning of the field is small compared to the product of $\gamma$ and the magnitude of the effective field. Stated in terms of reciprocals, and using $H_{eff}$ as the field which is turning, the assumption is valid whenever the time to turn $H_{eff}$ through one radian of angle is large compared to $1/(\gamma H_{eff})$. Noting that the magnitude of $H_{eff}$ at the moment of passing through resonance is equal to $H_1$, and using in place of "the time to turn $H_{eff}$ through one radian" the more convenient term $T_{change}$, defined as the time taken to effect the entire change from $H_{oi}$ to $H_{of}$, the above assumption may be said to be valid, and the criterion for what is called "adiabatic variation" of the field is satisfied, when
$$T_{change} > 1/(\gamma H_1).$$
In actual practice this is not a difficult requirement, since one is free to choose $H_1$ large enough to satisfy it. In practice, in order to make the mathematical analysis simple, we also require that $H_1$ be small compared to the static magnetic field at which resonance occurs, (in this case $H_e$ since $H_{of}$ is zero).

The significance of the preceding paragraph is this. When the conditions of adiabatic variation are met, as is assumed here, we can decrease the magnitude of $H_0$ from some high value $H_{oi}$ along the $z$ axis to final value $H_{of}$ along the $z$ axis equal to the value of $H_0$ for which the frequency of the rotating field $H_1$ is right for magnetic resonance, gradually enough that M is, for all practical purposes, continuously aligned with $H_{eff}$ in the $x_R z$ plane.

Now it will be seen, further, that if the conditions for adiabatic variation are preserved, there is no need to keep $H_0$ constant in direction (along the $z$ axis) while allowing its magnitude to decrease. While $H_0$ decreases in magnitude it might also be allowed to change in direction, and the final result would again be that M is maintained in alignment with $H_{eff}$, provided the conditions for adiabatic variation are still met.

The significance of the above paragraph is as follows. When the conditions of adiabatic variation are met, as is assumed here, we can decrease the magnitude of $H_0$ from some high value $H_{oi}$ along the $z$ axis to a final value $H_{of}$ along any axis, where $H_{of}$ is equal to the value of $H_0$ for which the frequency of the rotating magnetic field $H_1$ is right for magnetic resonance, gradually enough that M is, for all practical purposes, continuously aligned with $H_{eff}$, wherever it may be directed. In the special case where the direction of $H_{of}$ corresponds to the direction of the $y$ axis in the fixed frame of reference, we have M aligned with $H_1$ and, in the fixed frame of reference, rotating in the $xz$ plane.

Limitations Upon Rate of Change of $H_0$

In the above paragraphs it will be recalled that one limitation is placed on the rate of change of $H_0$, viz., that it must change slowly enough that
$$T_{change} > 1/(\gamma H_1).$$
An upper limit may also be placed on $T_{change}$, as follows. As $H_0$ shifts from large $H_{oi}$ to small $H_{of}$, the magnetic polarization M will tend to decrease from a large value corresponding to $H_{oi}$ to a small value corresponding to $H_{of}$. However the rate at which M can be allowed to change is limited by the spin-lattice relaxation time, $T_1$, so that if $T_{change}$ is greater than $T_1$, M will be able to diminish along with $H_0$, but if $T_{change}$ is less than $T_1$, it will not be able to follow the changes in $H_0$. Now if we wish M to remain as large as possible during the change, it is clear that $T_{change}$ must be made less than $T_1$. Summing up, we can express the operating range for $T_{change}$ as follows:
$$T_1 > T_{change} > 1/\gamma H_1$$
if M is both to follow $H_0$ in direction and to remain as large as possible. For simplicity in mathematical analysis we also require $H_1 << H_e$ when $H_{of}$ is zero.

Method of Observation -- Measuring $T_2$ and $T_2^*$

To illustrate how observations may be made, we shall employ the embodiment of FIGS. 1–3. FIGS. 4a through 4d show the time duration of application of field $H_0$ and $H_1$ and the resulting behavior of the magnetic polarization M and the detector signal.

Let us assume that the embodiment of FIG. 2 is employed. Current is assumed to have been flowing in the electromagnet 21a, 21b at a steady value for a time long compared to the thermal, or spin-lattice, relaxation time, $T_1$, of the sought for nuclear species, with the result that the magnetic polarization M is at full value, $M_0$, at a sample point in the formation and is aligned with the vector $H_{oi}$ as shown in the vector design in FIG. 2. The quantities $H_0$ and M are at this moment equal to $H_{oi}$ and $M_0$ as shown in FIG. 4a and FIG. 4c, respectively, where the instant of time is indicated by the numeral 1. Next the alternating field $H_1$, oscillating at the Larmor frequency for the nuclear species in the earth's field $H_e$, is applied in the direction shown in FIG. 2; this is done at the instant of time shown by the numeral 2 in FIG. 4b. Strictly, time 2 need only be any time prior to time 3. Shortly thereafter the electromagnet current is cut off at the instant 3 in FIG. 4a, and $H_0$ is caused to die off at the controlled rate specified herein in the section on "Limitations upon Rate of Change of $H_0$," to the point that there is effectively no applied field $H_0$ remaining, and the only unidirectional field left is the earth's field $H_e$, directed as shown in FIG. 2. At this moment, indicated by the numeral 4 in FIG. 4c, the magnetic polarization M begins to precess at right angles to $H_e$. (Prior to the instant of time 4, and in fact ever since the instant 2, M has been aligned along the effective field, $H_{eff}$ it is only at the instant 4 when $H_{eff}$ has both diminished to the value of $H_1$ and that M has reached directional alignment with $H_1$ that M is precessing at right angles to $H_e$.) As shown in FIG. 4c, this magnetic polarization M has heretofore been at full value $M_0$, and now it begins to decay with a time constant $T_2$, which is the true spin-spin relaxation time, with dephasing of the nuclear magnetic moments being caused by spin-spin interactions only. The nuclear magnetic moments are driven in precession by the $H_1$ field and are locked in, so that other dephasing factors, such for example as inhomogeneity in the earth's field, cannot take effect. Strictly what is being observed is $T_2(H_e)$, the true $T_2$ in the earth's field. In all practical cases of liquids this will also be $T_1(He)$, the spin-lattice relaxation time in the earth's field. After $H_1$ has been on, locking the magnetic polarization M in driven precession, for a time $T_{lock}$, lasting from the instant 2 to the instant 5 in FIG. 4b, it is abruptly turned off, and M thereupon enters into free precession and decays with relaxation time $T_2*$. Time 5 need only be any time after time 4, but the sooner after time 4 the better since the polarization M is diminishing with time. This relaxation time includes the effect of the earth's field inhomogeneity as well as the other dephasing factors. The two different relaxation times are shown in FIG. 4c.

In order to make measurements which will yield these relaxation times, observe what the detector signal has been doing all the while. The detector coil of FIG. 2 has an EMF induced in it at the precessional frequency about $H_e$. FIG. 4d shows that from time 2 to time 5 the amplifier into which the detector signal is fed is blocked by the $H_1$ leakage field in a typical case. Between instants 5 and 6 the amplifier is making a short recovery, and thereafter the output of the combined detector coil and detector circuit (including amplifier) puts out a faithful reproduction of the magnitude of the decaying M vector shown above in FIG. 4c. Clearly it is possible to measure $T_2*$ simply by observing this decay directly, as on an oscilloscope for example. Alternatively we can make a series of independent measurements of the magnitude of the decaying M vector at different times subsequent to the instant 6 and thus plot out the decay with time. It will be further explained below how such measurements can be carried out using the herein described apparatus. In order to measure $T_2$, however, it is necessary to make a series of observations, using different length $T_{lock}$'s, and to measure the initial magnitudes of the detector signal (as at the instant 6) for each observation in the series. Each such observation gives one point on the $T_2$ curve, and thus the curve can be constructed as shown in FIG. 4e. In every case where measurements of a decaying quantity are to be plotted vs. time, it is understood that the relaxation time can be obtained from the curve in well known ways. For example, for an exponential decay, one plots the logarithm of the decaying quantity vs. time and obtains the relaxation time from the slope of the straight line curve.

This invention is particularly well suited to use in petroleum well logging, and the description herein is directed primarily to that use, wherein the problem is to determine, by means of an instrument lowered down a borehole, whether there are hydrogen atoms present to a significant degree in the formations surrounding the borehole and also whether those hydrogen atoms are indicative of the presence of water or of hydrocarbons.

Although the invention is particularly well suited to use in petroleum well logging, it is not limited to that use. The well logging problem may be regarded as a special case of the more general problem where one wishes to measure the properties of a material which surrounds the measuring instrument, and the present invention is capable of making measurements of the properties of materials which surround the measuring instrument, whether they be earth formation materials as in well logging or, for example, the moisture content of a mass of material (grain, tobacco, soil sample) into which the measuring instrument is inserted.

Furthermore the invention is not limited to measurements on protons (i.e. nuclei of ordinary hydrogen), although the following description does dwell principally on measurements with protons. Protons are particularly important in petroleum well logging, since they are the indicator of the presence of hydrogenous material and further since their characteristic modes of behavior in water and in hydrocarbons are the key to whether there is water or hydrocarbon present. However, there are other chemical elements than hydrogen, the presence of which is important to know, whether for their own value or for stratigraphic correlation. This information may be desired as a guide for example to the presence of minerals such as fluorspar, phosphates, bauxite, borax, and spodumene. These minerals may be detected, using the present invention, by tuning to the following isotopes respectively, which respond to nuclear magnetism detection: fluorine-19, phosphorus-31, aluminum-27, boron-11, and lithium-7. The present invention is particularly well suited to making observations on such elements, and the reason is as follows. The present invention is capable of achieving a very high effective signal to noise ratio, with the result that many chemical elements generally considered too difficult to detect by nuclear magnetic resonance under adverse instrument conditions, such as in a borehole, can now be detected. Hydrogen has the highest nuclear gyromagnetic ratio of any atom, and the hydrogen atoms in water or in oil are present in high concentration, with the result that hydrogen has in the prior art been a preferred element to observe. Other elements, such as those named above, have lower gyromagnetic rations and are present generally at lower concentrations, and this means a poorer signal to noise ratio. However, the present invention makes it feasible to work with such elements other than hydrogen.

Measurements with Elements Other than Hydrogen

As stated above, the invention is not limited to measurements on hydrogen nuclei but is also applicable to nuclei of other chemical elements, such as fluorine, phosphorus, aluminum, boron, and lithium for example. In principle method is the same as described for hydrogen. However for the reasons given below in this same paragraph it would be advantageous to maintain a low unidirectional field $H_0'$ (as shown by dashed line in FIG. 4a) subsequent to the turnoff of the strong $H_0$ and all during the periods of time in which the precession of M is taking place and measurements are being made. When prospecting for solids, e.g. minerals in the earth, we are dealing with materials which have inherently a greater line width than fluids, such as oil and gas. This line width for solid materials may be as much as several gauss, and it is as if there were now an inherent inhomogeneity built into the material under observation and therefore the homogeneity of the earth's field is greater than we can take advantage of. Under these conditions there is no need to restrict ourselves to the low strength of the earth's field for the precessional field, and we may as well enjoy the advantage of as high an applied unidirectional field as we can obtain within the limitation that its inhomogeneity shall not exceed the inherent inhomogeneity of the material under observation. Incidentally also it should be mentioned that because of the lower gyromagnetic ratio of these other elements as compared to hydrogen, their precession frequencies in any given unidirectional field are correspondingly lower. This presents the drawback that, while the 2 kilocycle per second precession of hydrogen in the earth's field is not too difficult to make measurements with, the lower frequencies which would be found with the other elements would become too low for convenient measurements. The use of a low unidirectional field, greater than the earth's field, for the precession field as explained above thus alleviates to some extent the problem of making measurements on elements other than hydrogen.

To illustrate how observations may be made upon elements other than hydrogen, we shall again employ the embodiment of FIG. 2 and shall discuss it in terms of FIG. 4a through 4d. The procedure is identical to that given above under "Method of Observation — Measuring $T_2$ and $T_{2*}$" up to the application of the $H_1$ field. Then the alternating field $H_1$, oscillating at the Larmor frequency for the nuclear species in the low unidirectional field $H_0'$, is applied in the direction shown in FIG. 2; this is done at the instant of time 2 in FIG. 4b.

Thereafter the procedure for this purpose is the same as that outlined in the above quoted section with the exception that when we cut off $H_o$ we let it drop to a value $H_o'$ rather than to zero and we now substitute "low field $H_o'$" wherever $H_e$ occurred before.

Measuring $T_{1(high\ field)}$

The foregoing method is a "slow-turn-off" (STO) method to give the value of true $T_2$ at low field by a series of observations, each with different $T_{lock}$, and also the value of $T_{2*}$ at low field, e.g. by oscilloscope display. Moreover as stated above, in all practical cases of liquids $T_2$ at low field is equal to $T_1$ at low field.

However it is known that $T_1$ in general has different values in high and in low fields. Consequently it is sometimes desirable to measure $T_1$ at high field. There follows a description of a "slow-turn-off"c method for making such a measurement.

To measure $T_1$ in high field we make a series of observations, each observation being similar to that in FIGS. 4a through FIG. 4d, but with the polarizing field $H_0$ on for less than sufficient time to fully polarize the magnetic moments, i.e. for times $T_P$ of the order of and less than $T_1$, as shown in FIGS. 5a,b, c, and d. In the observation beginning as illustrated in FIG. 5a, $H_0$ is applied for the short interval $T_P$ starting at the instant of time 1 and ending at instant 3, it is to be understood that the ending at 3 is a "slow-turn-off" as defined above; again as in FIG. 4b the alternating field $H_1$ is applied from the time 2, (prior to 3) until the time 5 (subsequent to time 3 plus $T_{change}$), as illustrated in FIG. 5e; again we get the behavior of the magnetic polarization M and the detector output as illustrated in FIGS. 4c and 4d, and here it is illustrated in FIGS. 5f and 5g for the case of M not fully polarized. The value of M reaches the maximum value identified by $M_0$ in FIG. 5f, and the "Maximum Detector Output, Free Precession" is as shown at the time identified by the numeral 6 in FIG. 5g. This gives us one point for the curve plotted in FIG. 5h, showing "Maximum Detector Output, Free Precession" as a function of $T_P$. A second observation is made, beginning as illustrated in FIG. 5b, wherein $H_0$ is applied for the time interval $T_P'$ starting at time 1' and ending at time 3; again $H_1$ is applied from time 2 until time 5; again we get M reaching the maximum value $M_0'$ in FIG. 5f, and "Maximum Detector Output, Free Precession" is as shown at time 6' in FIG. 5g. Thus a second point is obtained for the curve of FIG. 5h. This process is continued as indicated in FIG. 5 until the whole curve of FIG. 5h is obtained. This curve is known to have the form, a Constant X ( 1 − $e^{-T_P/T_1}$), and consequently the value of $T_{1(high\ field)}$ can readily be deduced from it in well known ways.

Measuring $T_{1(low\ field)}$

Although in general it is not necessary to measure $T_{1(low\ field)}$ once we know $T_{2(low\ field)}$, since $T_2 = T_1$ for low fields, it is possible also to measure $T_1$ at any low field $H_0$. In order to get $T_{1(low\ field)}$ we observe the effect of allowing the magnetization to relax for different durations $T_R$ in a low field, without precessing, before ininitiating the $H_1$ field and making the observation of the "Maximum Detector Output." The fact that the relaxation is proceeding without any precession going on at the same time assures that the effect is pure $T_1$-relaxation, i.e. spin-lattice relaxation, unmixed with spin-spin and field inhomogeneity factors. The fact that the relaxation is allowed to proceed in the presence of a low field $H_0$, rather than the strong field $H_{0t}$, assures that the spin-lattice relaxation time observed is that which is characteristic of the low field phenomenon, not the high field phenomenon. The procedure for determining $T_{1(low\ field)}$ is illustrated in FIG. 6. One observation, yielding one point on the final curve, is as follows: $H_{0t}$ is applied from time 1 to time 3, an interval of time long compared to $T_1$, as shown in FIG. 6a. At time 3 $H_0$ is reduced from the strong field value $H_{0t}$ to the low field value $H_0'$ at which value it remains for a time $T_R$, which is the interval from time 3 to time 4 (Note that the turn-off at time 3 need not be a slow turn-off as defined above unless the direction of M undergoes a change during the turn-off; for practical purposes then the turn-off at time 3 need not be a slow turn-off as long as $H_0'$ is much greater than $H_e$). At time 2, intermediate time 3 and time 4, the alternating field $H_1$ is applied briefly until time 5, subsequent to time 4 plus $T_{change}$, as shown in FIG. 6b. The magnetic polarization M, having been at full value $M_0$ until the turn-off at time 3, experiences relaxation (without any precession) in the low field $H_0'$ remaining after the turn-off of $H_{0t}$. This relaxation is shown in FIG. 6e. At time 4, $H_0$ is further reduced by a slow-turn-off as defined above from $H_0'$ to zero, thus leaving the earth's field $H_e$ as the only unidirectional field remaining after time 4. As in the arrangements depicted in both FIGS. 4 and 5 the time 4 marks the beginning of driven precession about $H_e$, and again as in the preceding arrangements the time 5 marks the beginning of free precession about $H_e$. The detector receives a signal from the precessing magnetic moments beginning at time 2 and continuing until the precession decays after time 5, but it is only the latter part of the signal which is seen in the detector output, since the amplifier is blocked from time 2 to time 5 as shown in FIG. 6f. At time 5 the amplifier makes a short recovery, and subsequent to time 6 it gives a faithful measure of the decaying free precession signal. At the time 6 the observation is made, and this is the "Maximum Detector Output, Free Precession." which is plotted as indicated by the numeral 6 against the appropriate value of $T_R$ in FIG. 6i. The second observation, yielding a second point for the curve, differs only in that $H_0'$ remains on for a time $T_R'$ (greater than $T_R$) which is the interval from time 3 to time 4' (later than time 4), and $H_1$ is pulsed on for the same duration as before but beginning at time 2' intermediate time 3 and time 4', as shown in FIG. 6c. The detector output is correspondingly delayed and has a correspondingly different value for the maximum output under free precession as shown at time 6' in FIG. 6g. This kind of observation, varying $T_R$ and getting a corresponding value for the "Maximum Detector Output, Free Precession," can be made as many times as desired, and the points so obtained define the curve for relaxation time $T_1$ (low field, $H_{01}$) as shown in FIG. 6i.

It is also possible to determine $T_1$ for the limiting case of the earth's field, i.e. $H_0'$ equal to zero. This measurement will be seen to be similar to that shown in FIG. 6 for low field $H_0'$. The difference is that at time 3, $H_0$ is reduced by slow-turn-off to zero, thus allowing the magnetic polarization M to align itself with the earth's field $H_e$. Upon reaching this alignment M is practically at full value $M_0$ and now begins to experience relaxation (without precession) in the low field $H_e$, as shown in FIG. 6e'. To obtain $T_1$ under these circumstances one permits the relaxation to proceed for a first measured time $T_R$ and measures M, then one starts again and permits the relaxation to proceed for a second measured $T_R'$ and measures M again, etc. The step of measuring M consists, as shown in FIG. 6a', of first (using a slow turn-on) applying perpendicular to $H_e$ at time 1A, delayed $T_R$ after time 3, a polarizing field of reduced magnitude $H_0'$, which is large compared to $H_e$ and to $H_1$, to get the M vector again into a plane at right angles with the earth's field $H_e$, then at time 2 applying the alternating field $H_1$, oscillating at the Larmor frequency for the nuclear species in the earth's field $H_e$, then at time 4 executing a slow-turn-off of the polarizing field $H_0'$ and allowing the M vector to enter into driven precession about $H_e$, and then at time 5 removing the $H_1$ field and allowing the M vector to enter into free precession about $H_e$, and finally making a measurement of the magnitude of the M vector as in the previously described methods. A second, third, etc. measurement of M can then be made similarly, using different delay times $T_R'$, $T_R''$, etc. between the moments of time designated 3 and 1A', 3 and 1A'', etc. It will be seen that the M vector is decaying according to $T_1$ for earth's field only in these intervals $T_R$, $T_R'$, $T_R''$, etc., for it is only in these intervals that the M vector is aligned with and subjected to the pure earth's field $H_e$ unmixed with other fields. At time 1A, or 1A', or 1A'', the decay of M in the earth's field is arrested, whereupon by use of $H_0'$ and $H_1$ the M vector is placed into free precession in the characteristic manner of this invention, thus permitting measurements to be made of M corresponding to the several different delay times, $T_R$, $T_R'$, $T_R''$, etc. as shown in FIGS. 6f, 6g', 6h', etc., and values to be plotted as shown in FIG. 6i.

Apparatus

The above described methods can be carried out with the apparatus of FIGS. 1–3 which show a circuit for the flow of controlled DC power to the $H_0$ coils, the flow of controlled audio frequency power to the $H_1$ coils, and the output of modulated audio frequency signal from the detector coil to the detector channel. In the detector channel are shown blocks of apparatus, described above, for performing phase coherent detection, followed by boxcar integration of the signal, and final presentation of the output on the recorder. The detailed operations of this detector channel have not been described above and will be treated hereinafter. The combined phase coherent detection and boxcar integration is capable of substantial improvement in the signal to noise ratio, as will be explained below.

The reason that audio frequency equipment is specified is that the earth's field having a value of approximately 0.5 oersted, the Larmor frequency for hydrogen nuclei (the most likely species to observe in nuclear magnetism logging) is approximately 2 kilocycles per second, which is in the audio frequency range. The adjustment of the audio frequency to the correct value for $H_e$ is discussed below.

First, to illustrate how any of the operations above described may be carried out, we shall describe the use of the apparatus of FIGS. 1–3 for carrying out the method of FIG. 4. However it will be seen that by choice of appropriately different sequences, the same apparatus can be used to carry out the methods of FIGS. 5, 6, and 6' also.

In the method of FIG. 4 the $H_0$ field is applied from time 1 to time 3. In FIG. 3 this is effected by the arrival of the trigger signal from the trigger generator 31 to activate the polarizing pulse generator 33, which feeds the DC power supply 34 for the $H_0$ polarizing field coils. The duration of the polarizing field pulse, i.e. from 1 to 3, is controllable at the polarizing pulse generator 33. The cut-off of the polarizing pulse at time 3 is controllable by a shaping circuit, consisting of an integrator followed by a clipping circuit, so that the desired slow-turn-off is obtained in accordance with the procedure explained hereinbefore. Concurrently with the initiating of the polarizing pulse, the same trigger signal enters the trigger and pulse generator 32. At a controlled time 2 prior to 3, the gate pulse lasting from 2 to 5 is initiated and sent from the trigger and pulse generator 32 to the gated amplifier 37. A trigger pulse at time 5 is also sent from the trigger and pulse generator 32 to the gate with variable delay 35. The gate pulse (lasting from 2 to 5) passes to the class C amplifier 39 a gated portion of the continuous wave (CW) output from the audio oscillator 38. This gated audio pulse is passed through the impedance matching network 40 and the amplifier 27 to the $H_1$ coil 22 of the nuclear magnetism logging apparatus and supplies the alternating $H_1$ field pulse shown in FIG. 4b. The output from the detector coil 23 of FIG. 3 is fed through the pre-amplifier 29 to the amplifier 41 and thence to the mixer 42, yielding the mixed signal having for its trailing edge the free precession decay envelope formerly depicted in FIG. 4d, e.g. beginning at time 6. This output signal of circuit 41 is shown in FIG. 3 as the "Nuclear Magnetism Signal," where it is depicted not as having the smooth, pure exponential shape of FIG. 4d but as having a distorted shape due to noise.

The nuclear magnetism signal is fed into the phase coherent mixer 42, where it is added to the CW reference signal, of the same frequency, which reference signal has originated in the audio oscillator 38. The CW reference signal has been passed through a phase shifter and limiter amplifier 43 where the phase of the reference signal has been adjusted to be the same as the nuclear magnetism signal. The output from the phase coherent mixer 42 is the mixed signal as shown in FIG. 3. It lends itself well to measurements which permit averaging out the noise component as will be explained further below. This mixed signal is fed into the boxcar integrator 36, which measures the signal in a preselected time interval as indicated in FIG. 3 between the times 7 and 8 for example. This interval is controllable as to duration by adjustments in the boxcar integrator 36 and as to time of initiation, i.e. the delay from time 5 to time 7, by adjustments in the gate with variable delay 35. The boxcar integrator 36 not only measures the signal in the prescribed interval, but also performs this measurement in that same interval in a number of repeated observations of the nuclear magnetism signal, and then integrates or averages all the measurements. Thereby the random noise component of the observed signal averages out nearly to zero and the desired information component is retained. The final output with signal to noise ratio thus enhanced is fed to the recorder 17 as shown in FIG. 3.

It is to be noted that the instant of time 7 and the interval of time 7 to 8 can be so chosen that the final output so obtained and fed to the recorder 17 in FIG. 3 is a measure of the "Maximum Detector Output, Free Precession" specified by the instant of time 6 in FIG. 4d et seq., or of any point subsequent to time 6 on the curve of "Detector Output." It is also to be noted that the output of the phase coherent mixer 42 is shown fed to a cathode ray oscilloscope (CRO) 44 in FIG. 3. This permits visual or photographic observation and measurement of the relaxation time $T_{2=}$ as mentioned in the section headed "Method of Observation -- Measuring $T_2$ and $T_{2=}$." Thus, the apparatus of FIGS. 1–3 is seen to provide the measurements required for the methods depicted in FIGS. 4, 5, 6 and 6'.

The apparatus of FIG. 3a is substantially identical with that of FIG. 3 (corresponding elements are identified with similar reference numerals), except that the apparatus of FIG. 3a does not employ a phase coherent mixer, or any other non linear detector for that matter, between the output of the signal amplifier 41 and the signal enhancement system which is shown as Multichannel Digital Integrator 36a in FIG. 3a. It will be appreciated that since the Phase Coherent Mixer is omitted in the embodiment of FIG. 3a, no CW reference signal is required to be derived from the Audio Oscillator 38, thus the Phase Shifter and Limiter Amplifier 43 is unnecessary and is likewise omitted.

In the apparatus of FIG. 3a the nuclear magnetism signal derived from the Signal Amplifier 41 is supplied directly to the Multichannel Digital Integrator 36a, which is apparatus of the type sometimes described as a "computer of average transients."

Advantageously, both positive and negative half cycles of every successive cycle of the NMR signal are supplied to the Multichannel Digital Integrator 36a in order to provide a rate of data acquisition which optimizes the duty cycle of the signal enhancement system during the time interval that the nuclear magnetism signal is being measured. A separate channel is required for each one half cycle since the signal changes sign each half cycle.

When the magnetic resonance signal is derived from nuclear magnetic precession in the earth's field where the characteristic Larmor precession frequency is about 2 kilocycles per second a 100 millisecond signal sampling interval requires a 400 channel digital integrator to provide maximum duty cycle operation for the system of FIG. 3a.

In the embodiment of FIG. 3 we are free from the requirement of using a channel for each one half cycle, since the number of channels is determined by the requirements of the operator to record details of the decay envelope. Thus, more channels may be necessary if the signal is thought to contain several decay rates, e.g. depending upon the number of components of interest, than if only one decay rate is present.

Among the advantages of both the FIG. 3 and 3a systems is large dynamic range. This is because we do not use a non linear detection system in either embodiment. We use a linear detection system in the FIG. 3 embodiment. It is noted that although a mixer, as in FIG. 3, is a non linear device, per se, it is employed in a linear detection system since the input signal and output signal are linearly related over its operating range, extending from an upper amplitude limit down to zero, which is approximately of the order of the reference signal.

Referring now to FIG. 7A there is shown a further embodiment of the present invention, generally similar to that of FIG. 3 as modified by the substitution of a frequency controlled audio oscillator (f.c.a. oscillator) 38A together with associated equipment for controlling the frequency thereof as a function of the earth's field $H_e$ in the vicinity of the logging instrument, in place of the audio oscillator 38 of FIG. 3. (Corresponding elements of FIGS. 3 and 7A are identified with similar reference numerals.)

Figure 7B:
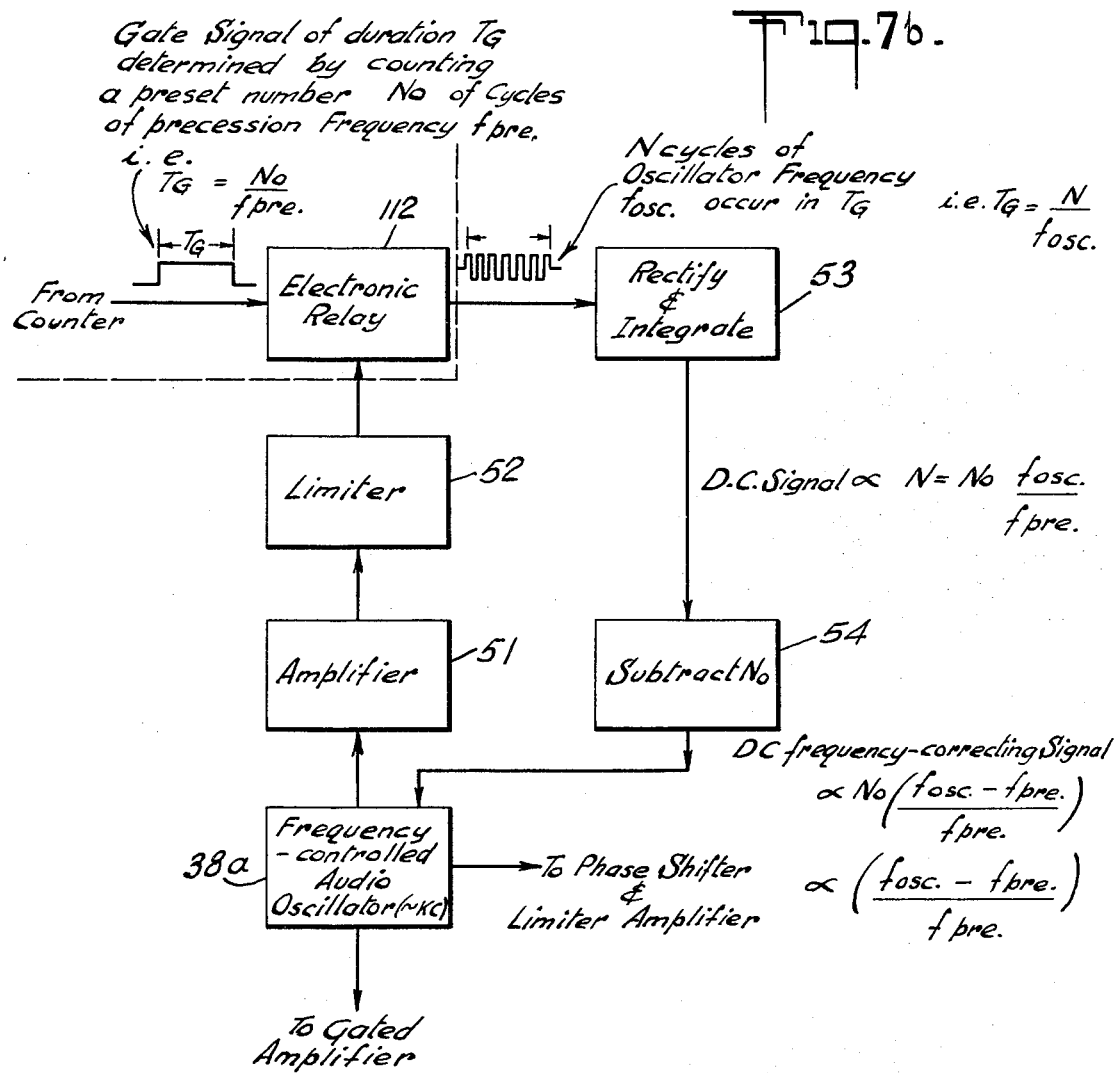
FIG. 7b is a schematic representation, in block form, showing in further detail the portion of FIG. 7a designated NMR frequency controlling circuit 50.

Even if the frequency of $H_1$ is correctly at the Larmor frequency in the earth's field $H_e$ at one location, the value of $H_e$ may not be the same at all points along the borehole and accordingly the audio frequency should preferably be continuously readjusted, as by use of the embodiment illustrated in FIG. 7A, so that the frequency of $H_1$ is maintained substantially at the correct Larmor value for the precise value of the earth's field $H_e$ encountered throughout the borehole. The equipment of FIG. 7A provides this continual readjustment as follows: A frequency-controlling circuit, shown within the dashed box 50, and shown in further detail in FIG. 7B, continuously controls the frequency output of the frequency controlled audio oscillator 38A in response to the signal output of a highly sensitive magnetometer which is sensitive to the earth's field in the vicinity of the borehole logging instrument 14. The magnetometer is preferably of the nuclear magnetic resonance type, with the magnetometer signal head 101 and associated electronics being located in the logging instrument 14 so that it can continuously determine the magnetic field strength $H_e$ in the vicinity of the sample, e.g. earth formations being logged in accordance with the present invention.

The frequency control circuit of the f.c.a. oscillator 38A may be a circuit such as that disclosed for example in Theory and Application of Electron Tubes, H. J. Reich, McGraw-Hill (1939), pgs. 362–363. This control circuit requires a D.C. error-signal or frequency correction signal in order to effect and maintain the desired control of the audio frequency output of the frequency controlled audio oscillator 38A. This error signal is obtained by means of a closed loop frequency controlling system 50 wherein the output of the audio frequency oscillator is continuously compared to the correct frequency as provided by a well-known type of magnetometer, and a D.C. frequency correcting signal is generated and fed back into the control circuit of the audio oscillator 38a. The magnetometer is preferably a nuclear magnetic magnetometer such as the Varian magnetometer described in U.S. Pat. No. Re. 23,769. Such a magnetometer makes use of a nuclear magnetic resonance in measuring magnetic fields, consequently this device lends itself peculiarly well to the purpose at hand. The Varian device provides a precise measure of the Larmor frequency of a selected sample containing hydrogen nuclei in the earth's field $H_e$ and from this measured frequency one can compute the field strength. $H_e$, or the field strength can be automatically computed in known manner, for example, as disclosed in the Varian patent. In the event that one is observing the same nuclei in the earth formations along the borehole, as those of the selected sample within the magnetometer, e.g. hydrogen nuclei, one can omit the conversion from measured Larmor frequency to field strength since the measured Larmor frequency is itself the desired quantity for adjusting the frequency of the audio oscillator. Thus, the Varian device, substantially as shown in FIG. 1 of the aforementioned reissue U.S. Pat. No. Re. 23,769 may be employed as the magnetometer with certain modifications as noted herein. The elements of FIG. 7a of this specification which correspond to those of U.S. Pat. No. Re. 23,769 are identified herein with corresponding reference numerals plus one hundred (+ 100). Thus, the signal head 101 of FIG. 7a corresponds to signal head 1 of U.S. Pat. No. Re. 23,769, etc. The frequency source 13 and reference counter 14 of FIG. 1 of the Varian patent may be omitted in the case where it is not necessary to compute the actual magnetic resonance frequency. The apparatus shown in FIG. 7a comprises a nuclear magnetic resonance magnetometer like that of the Varian U.S. Pat. No. Re. 23,769 including a magnetometer signal head 101 located in the logging instrument 14 where it is appropriately spaced and shielded from the magnetic resonance logging instrumentation to avoid mutual interference.

The magnetometer signal head 101 contains an appropriate sample of matter of known nuclear character, such as hydrogen nuclei, susceptible of being placed in nuclear magnetic precession in the earth's field $H_e$, together with means such as a surrounding large coil of wire for applying a strong polarizing field to the sample and for detecting the precession of polarized nuclei of the sample in the earth's field. The polarizing field is produced by a current flowing in the sample head coil supplied from a power supply 104 under the control of a coil switch 103 which may be an electronic gate which is opened to abruptly terminate the current flow.

While the coil switch 103 may be electrically or mechanically activated it is advantageously controlled by a sequencer 106 which, in turn, is controlled from the surface by means of a magnetometer master control Circuit 60. A resistive element 105 is employed to limit the flow of current in the magnetometer sample coil. The resistive element 105 advantageously has non-linear characteristics, such as thyrite, to produce a more rapid drop in the field of the coil. A measuring circuit switch 107 is closed shortly after opening of the coil switch 103 to connect the pre-amplifier 109a and condenser 108 to the coil of the detector head 101. The sequencer 106 incorporates time-delay means for determining the time interval between the opening of the coil switch 3 and the closing of the measuring switch 107 for sequencing these two switching operations with a suitable intervening time-delay. The condenser 108 is connected across the coil of the detector head 101 after the transients caused by cutting off the current have died sufficiently. This forms a resonant circuit with the coil which is approximately tuned to the precession frequency of the selected nuclei in the known sample of the signal head 101. Since the precession frequency of the nuclei in the sample 101 is determined by the nature of the nuclei and the strength of the magnetic field while precession is taking place it is necessary to know the characteristics of the nuclei in the sample so that the characteristic precession frequency of the nuclei can be correlated with the unknown value of the earth's magnetic field $H_e$ at the place of the measurement.

The precessing nuclei will induce an alternating voltage in the coil of the detector head 101 which will be impressed on the pre-amplifier 109a when the switch 107 is closed for transmission to the magnetometer surface electronics where it is amplified by the amplifier 109b, the output of which is applied to a limiter 110 which serves to transform the output into a substantially square wave. It is to be understood that the amplifier 109b and limiter 110 may actually comprise separate functions of a common circuit. The square wave output of the limiter 110 is coupled to a counter 111 which functions to trip the electronic relay 112. It is understood that the output of the electronic relay 112 may be employed in conjunction with a reference counter and a standard frequency source as shown in the Varian patent, which function as "an electronic stopwatch" of a very high speed and precision for counting the elapsed time during a prescribed number of cycles of the precession frequency of the known nuclei in order to provide means for automatically measuring the field strength $H_e$ at magnetometer sample location. In the present instance however, it is not necessary to provide a visual signal indication of the measured strength of the earth's field $H_e$ at the magnetometer sample location; it is only necessary that the signal obtained by the magnetometer be employed to control the frequency of the *fca* oscillator 38A, as described further herein.

This magnetometer device operates by applying a polarizing field to the known sample so as to polarize atomic nuclei thereof at an angle with respect to the precessional field to be measured, e.g. the earth's field $H_e$. The polarizing field is then quickly shut off leaving polarization produced by the polarizing field to precess about the precessional field $H_e$. It is necessary that the polarizing field be shut off in a time short compared to the relaxation time $T_1$ of the nuclei of the known sample in the magnetometer head 101. The polarizing field should be reduced from a value equal to the precessional field to zero in a time short compared to one cycle of the nuclear precession. This is a so-called fast turn off (FTO) technique, as distinguished from the adiabatic slow turn off (STO) used in carrying out the earth sample analysis of the present invention.

The magnetometer master control unit 60 is employed to control the operation of the magnetometer in response to the output of the trigger generator 31 of the present borehole magnetic resonance logging apparatus so that the magnetometer will supply an indication of the earth's field $H_e$ in the vicinity of the logging head 14 at frequent intervals in order to control the frequency of oscillator 38A to be closely the same as the Larmor frequency for protons in the earth's field $H_e$ in the place where the logging measurement is being made at all times. Advantageously, therefore, the magnetometer functions to make a measurement and supply a control signal to the frequency controlled oscillator 38A each time that a magnetometer measurement is made. It is not necessary, however, with the present circuit to precisely correlate the phase of the precession signal derived by the magnetometer with that of the frequency controlled audio oscillator 38A; e.g. it is not necessary that the two be locked in exact phase with one another.

The placement of the components of the magnetometer portion of the logging system, shown in FIG. 7a, as between the downhole logging instrumentation and surface electronics, is intended primarily for purposes of illustration, it being understood that the precise placement of these components may be chosen in accordance with well known principles of electronics which have been carried out in the construction and use of such magnetometer equipment prior to the present time. It is noted that the corresponding elements of the magnetometer shown in FIG. 1 of the Varian patent are identical to those of FIG. 7A with the exception of amplifier 9 of FIG. 1 of the Varian patent which has as its counterpart in present FIG. 7a a preamplifier 109a in the downhole instrumentation and an amplifier 109b in the surface electronics. Also shown in the present system, in addition to the apparatus of the Varian patent, is the magnetometer master control unit 60 shown along with the surface equipment for controlling the timing of the sequencer 106 in the downhole magnetometer equipment which, in turn, controls the timing of the switching functions for the polarizing and measuring aspects of the operation of the magnetometer. The magnetometer master control 60 is, in turn, controlled by the trigger generator 31 of the logging system so that its operation can be correlated with the operation of the borehole magnetic resonance logging system as discussed above.

The output of the counter 111 serves to trip the electronic relay 112 so that a square wave reference signal at the oscillator frequency is derived from the frequency controlled audio oscillator 38A, via the limiter 52, and gated to the rectify and integrate circuit 53 during the selected time intervals determined by the counter 111 for developing the appropriate correction signal for the frequency controlled oscillator 38A when changes in the measured earth's field $H_e$ in the vicinity of the logging instrument 14 requires such a correction.

The frequency correcting circuit 50 operates in the following manner. A signal at the oscillator frequency $f_{osc}$ is passed from the frequency controlled oscillator 38A through the amplifier 51 to the limiter 52 which serves to convert the sine wave output of the oscillator to a square wave at the oscillator frequency. This square wave is fed into the electronic relay 112 of the magnetometer as shown in FIGS. 7a and 7b. The electronic relay 112 is controlled by the operation of the magnetometer device so as to be gated open for a time duration $T_G$, which is determined by counting a preset Number $N_0$ of cycles of precession frequency $f_{pre}$, the indications of the start and finish of the time interval $T_G$ being supplied thereto from a counter 111 of the magnetometer. Thus $T_G = N_0/f_{pre}$. During the open period $T_G$ of the relay 112 a number $N$ of cycles of oscillator frequency $f_{osc}$ are passed through the relay 112. Thus $T_G = N/f_{osc}$. From these two equations for $T_G$ we find that $N = N_0 (f_{osc}/f_{pre})$. Therefore by rectifying and integrating the output from the Relay 112 we get a D.C. signal which, being proportional to the total number $N$ of oscillator frequency pulses within the time span $T_G$, is also proportional to $N_0(f_{osc}/f_{pre})$. A D.C. signal proportional to $N_0$ is then subtracted, and the difference, a signal proportional to $N_0(f_{osc}-f_{pre})/f_{pre}$ and thus proportional also to $(f_{osc}-f_{pre})/f_{pre}$, is the desired error signal or frequency-correcting signal, which is fed back into the audio oscillator. In this way the frequency-control circuit in the audio oscillator is able continually to make the correct adjustment in the oscillator frequency so that the oscillator frequency is maintained substantially equal to the precession frequency for hydrogen nuclei in the ambient earth's field as the logging tool moves along the borehole.

An embodiment in addition to that illustrated in FIGS. 7a and 7b and discussed above for accomplishing the same purpose is to use a frequency synthesizer, such as described in the General Radio Experimenter, Vol. 41, No. 1, Jan. 1967, to maintain the frequency of the audio oscillator of FIGS. 7a and 7b continuously adjusted to an exact zero-beat match with the correct frequency, i.e. the Larmor frequency of the observed nuclei in the earth's field as provided for example by a nuclear magnetism magnetometer.

Figure 7C:
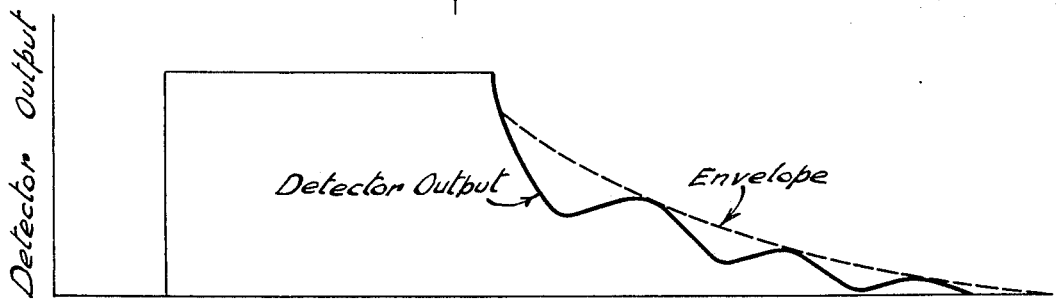

If for any reason the audio oscillator frequency becomes different from the nuclear magnetism precession frequency the method of this invention still operates, although there are these differences. Instead of obtaining from the phase coherent detector a signal which gives directly the curve for relaxation time, as when the two frequencies are exactly the same, one obtains from the phase coherent detector a beat signal having a frequency that is the difference frequency between the two. This beat signal of course has its own envelope, and this envelope now is the desired curve for relaxation time. FIG. 7c depicts this condition, showing the detector output just as in FIG. 4d, for example, but with the difference that in FIG. 7c, it is assumed that the oscillator frequency and the precession frequency are not exactly the same. A beat signal is obtained, and this beat signal has an envelope as shown. The envelope provides the desired curve for relaxation time.

Enhancement of the Signal to Noise Ratio

An integrating device for improving signal to noise ratio requires that the noise be both positive and negative, in order that the noise can be made to cancel out by algebraic addition. However, if the problem is to reduce the noise that is present with an A.C. signal, say 2 kilocycles per second, one may well ask what is the meaning of "positive and negative," since the A.C. signal itself is also both positive and negative. The answer is that we must take a 2 kilocycle per second reference. By comparison with it, we may distinguish cases where both the reference and the noise are in step from cases where the reference and the noise are out of step. That is, the plus and minus quality of noise has meaning only in terms of whether the noise is plus or minus with respect to the reference. If one has a mixture of an A.C. signal and of noise which is of large amplitude compared to the signal, and if this mixture is detected by an ordinary diode detector, the output viewed on an oscilloscope shows the strong noise signal has been rectified, not averaged out, and the desired A.C. signal has been lost in the rectified noise signal. If, however, the A.C. signal in the mixture is made large compared to the noise, as for example by adding a large constant amplitude reference A.C. signal to the desired signal, at the same frequency and exactly in phase with it, then the oscilloscope shows the desired A.C. signal added on top of the reference signal, and the noise has been averaged out. It is this step which characterizes the present phase coherent detection method, namely, the step of adding a large coherent (i.e. same frequency and same phase) signal to the desired weak signal in order to establish a reference level with respect to which a diode detector, receiving the total signal a number of times repetitively, can then average out the noise component and emphasize the desired signal.

It will be seen that there are two essential requirements to be met in any such procedure for enhancing signal to noise ratio by repeatedly sampling the signals and averaging out the noise: 1) in adding the sample of the many-times-repeated signal one must make certain that the repeated samples are keyed together in the adding process so that maxima (or minima, or like zero crossings) always occur in step, i.e. the repeated samples must be made phase coherent with each other; 2) the level of the composite signal, containing the desired signal, the noise, and whatever additional signal may be added for the purpose of the enhancement procedure, must be made greater than the maximum noise amplitude, so that the algebraic addition of the noise in the repeated samples will cause canceling out of the noise component, i.e. a diode detector will pass all the noise and thus allow it to be canceled out and will not rectify the noise, since rectifying would have the effect of passing only a portion of the noise and thus precluding good cancellation. In the phase coherent detection method presented herein the first requirement, the coherency requirement, is met by employing for the reference (i.e. the signal to be added to the signal being measured) an alternating signal having a fixed phase relationship with and nearly the same frequency as the desired signal, the reference being carefully adjusted to have a specified phase relationship with the desired signal at a specified time. Note that a small frequency difference can be tolerated, it merely gives beats as indicated in FIG. 9B. What is required, however, is that at some point on the signal there be a fixed phase relationship between signal and reference, so that at the start of each observation of the free precession signal, the signal and reference are in the same phase relationship. The simplest instance of meeting these requirements is where the signal and reference have identical frequency and are exactly in phase. The second requirement, the reference greater than noise requirement, is met by employing a sufficiently strong signal for the signal to be added to the signal being measured.

The principle of signal to noise ratio enhancement by the combined use of phase coherent detection and boxcar integration is illustrated in FIG. 8. At 8A-1 we have the nuclear induction signal which is the desired component within the total output from the signal amplifier. This nuclear induction signal has an exponentially decaying envelope, and it is the time constant of this decay which it is desired to measure. The difficulty is that the signal is of such small intensity that it tends to be masked by noise of the same order of magnitude. Noise consists of electrical signals of random intensity, frequency, and phase. The noise component is illustrated at FIG. 8A-2. At this point it should be said that FIGS. 8A, 8B and 8C represent successive situations, and the boxcar integrator averages the contribution of all such situations (8A, 8B, 8C, etc. up to a large number) in order to obtain the desired effect with the signal to noise ratio enhanced. Thus the noise component in 8B is, as it should be, entirely different from that in 8A, although of course the nuclear induction signal is still the same in 8B as in 8A. Again in 8C noise is different, and signal is the same. Now, adding the noise and the induction signals, we find the total or actual output from the signal amplifier as shown in 8A3, 8B3, and 8C3. The envelope for each of these Total Outputs is indicated by broken line, showing approximately what the envelope would be taken to be if in each case conventional detection were to be practised, without benefit of phase coherent detection and boxcar integration. It is clear that the apparent envelope obtained from 8A3, or 8B3, or 8C3 alone is of little value for deducing the true envelope and its decay time constant. The process of phase coherent detection and boxcar integration is effected by the steps illustrated in 8A4 and 8A5, and the corresponding portions of 8B and 8C. First, a reference signal is added as at 8A4, having the same frequency as the nuclear induction signal, being adjusted to the same phase as the nuclear induction signal, and having a constant amplitude at least as large as the total signal with which it is to be mixed. The mixed signal, the sum of the amplifier output and the reference signal, is shown at 8A5. The broken line envelope indicated in 8A5 is approximately the signal which is supplied by the phase coherent detector to the boxcar integrator for this one observation, and so also with the broken line envelopes in 8B5 and 8C5 for second and third observations respectively. The boxcar integrator then integrates or averages all such observations and samples a preselected portion of this average, such as in the time interval between times 7 and 8 in FIG. 3 in the output from the boxcar integrator.

In a preferred embodiment a double boxcar method is used, wherein one boxcar integrator samples the preselected portion such as in the time interval between times 7 and 8 in FIG. 3, and another boxcar integrator, triggered to operate at a later time, after the nuclear magnetism signal has completely decayed, such as in the time interval between times 9 and 10 in FIG. 3, samples the average value of the baseline. The difference between the output signals of the first and second boxcars gives a signal proportional to the desired nuclear magnetism signal. The advantage of the second boxcar is that variations in the baseline affect the output signals of the two boxcars equally and therefore have no effect on the signal difference.

It will be seen that the envelope in 8A5, or 8B5, or 8C5 by itself is a little better than the envelope before addition of the reference signal, as in 8A3, or 8B3, or 8C3, but the principal improvement is achieved by the averaging of all the envelopes so to speak, which is what the boxcar integrator does. By averaging, one retains the desired nuclear induction signal component at full strength, but the noise component averages out to nearly zero. The more individual observations are taken, such as 8A, 8B, and 8C, the more nearly the noise averages to zero. FIG. 8D shows the envelope obtained by boxcar integration or averaging of the entire length of the three single inputs, 8A, 8B, and 8C illustrated; and it is clear that the envelope so obtained is approaching the true envelope indicated in FIG. 8A1. The combined phase coherent detector and boxcar integrator may easily provide many orders of magnitude improvement in signal to noise ratio over that which is possible with a simple diode detector.

The above description of a method to enhance the signal to noise ratio employs what might be called analog boxcar integration of the output from the phase coherent detector. It utilizes the actual output signal from the detector and integrates it in an actual circuit element having a finite time constant. Consequently, for practical purposes, an analog boxcar integrator, while affording a vast improvement over non-integrating methods, is itself limited by the finite time constant of its integrating circuit. On the other hand, it is now possible with equipment that is available to perform digital boxcar integration. In a preferred embodiment using a multi-channel digital boxcar integrator, the output from the detector is chopped up into a large number (e.g. 400) of successive time segments, and each segment is digitized and fed into a channel where it is stored in a memory device. On the next and each succeeding occurrence of the repetitive signal from the detector, the signal is again chopped up, and corresponding segments are digitized and fed into their proper channels and accumulated in the memory device. By use of many channels one obtains a more detailed record of the signal variations with time. The more important advantage, however, is that by digitizing one avoids the need for integrating circuits with finite time constants, and one can obtain through digitizing a virtually infinite integrating time. This is advantageous since the longer the integrating time, the more occurrences of the repetitive signal one can average together, and therefore the better the ultimate signal to noise ratio.

Some Advantages of This Invention over Previous Developments

An outstanding advantage of the invention described over previous developments is that it provides a combination of the best features as follows: 1) the observation under conditions of free precession gives the advantage of freedom from the microphonics and the feedthrough of interfering electrical signals which plague the practitioner of driven precession techniques; 2) the use of phase coherent detection and boxcar integration gives the advantage of signal averaging, giving effectively infinite sample size when using the digital method. Now by use of the present invention it is possible to have the best features of both the free precession and the driven precession, without the attendant disadvantages of either.

Needless to say, a highly linear detector is an important advantage. One example of the value of good linearity is found in the measurement in well logging of mixed relaxation times. Good linearity is important enough when one has the problem of determining a single component relaxation time from the slope of the logarithm of the detector output vs. time. It is vastly more important when there are multiple components present, each with different relaxation time, and the separation of the different components must be effected by the well-known technique used in radio activity analysis of subtracting out one component at a time from a semilogarithmic plot. In the case of such multiple components any departure from linearity in the detector introduces errors which build up more and more with each successive subtraction of components.

Apparatus for Phase Coherent Detection and Boxcar Integration

Apparatus for carrying out the above described functions of phase coherent detection with analog boxcar integration is described in the paper, Observation of Ultra Slow Translational Diffusion in Metallic Lithium by Magnetic Resonance by David C. Ailion and Charles P. Slichter, Physical Review 137, A235 – A245 (1965).

Another Approach to Magnetic Resonance

An approach to magnetic resonance will now be described which is an alternate approach to that described above. We start as before, assuming a sample of matter containing gyromagnetic particles, e.g. hydrogen nuclei, which have been both spin and magnetic moment. We polarize, by applying $H_0$ and waiting a sufficient time (i.e. several times the spin-lattice relaxation time, $T_1$) for the magnetic polarization M to reach full value in the same direction as $H_0$, i.e. along the z axis. M is the average or net polarization of all the contained gyromagnetic particles. Once again we assume a situation where the earth's weak field $H_e$ is the only available magnetic field of good homogeneity and it is assumed to be along the y axis in this illustration.

We then turn off the $H_0$ field at the same controlled slow rate of turn off as defined above in the section headed "Limitations upon Rate of Change of $H_0$." This slow-turn-off results in the magnetic polarization M still at or nearly at full original strength but now aligned along the earth's field $H_e$, in the y direction. This gives us the strong polarization of the strong (but inhomogeneous) field $H_0$, and yet leaves it in a position to be driven in nuclear precession about the homogeneous (but weak) field $H_e$. At this point we may apply the A.C. field $H_1$ at the Larmor frequency corresponding to the particular nuclear species, e.g. hydrogen nuclei, and the field strength $H_e$, and observe the resulting magnetic resonance effects, for example, by modulating the frequency of $H_1$, through the resonance value or by sweeping a small D.C. magnetic field whose direction is nearly along $H_e$.

Once we have a procedure for achieving alignment of M with the rotating axis $x_R$, whether by first effecting slow-turn off and then applying the $H_1$ field or by first applying $H_1$ and then effecting slow-turn-off, it is evident that nuclear magnetic signals can be obtained in any of the well known ways, including resonance absorption, induction, dispersion, or preferably in the pulse method with decaying free precession as described above under "Method of Observation" and successive sections.

It will be appreciated that the last-mentioned method of approaching resonance lacks certain advantages of the preferred technique of sweeping onto resonance previously described herein. The advantage of first applying $H_1$ and then effecting the slow-turn-off in order to sweep onto resonance is that the magnetic polarization M is immediately in driven precession at the moment $H_0$ has died away (the time 4 in FIG. 4), and there is no delay while M approaches alignment with the rotating axis $x_R$.

The advantages of the herein described pulse method with decaying free precession over a method which employs pulsing of the $H_0$ field to accomplish more or less the same purpose, viz. to measure relaxation time, are the following:

1. The present method makes available the A.C. reference signal, relative to which the phase of the magnetic induction is locked, and by means of which we can practice the powerful signal to noise ratio enhancement method described above, yielding for this work with low intensity signals tremendous improvement in the signal to noise ratio over conventional methods with the consequent advantage that signal averaging can be performed, in fact, when the digital technique is combined with it, the improvement in signal to noise ratio is limited only by how long one is willing to average;

2. The present method of phase coherent detection, taking advantage of the A.C. reference signal which is available, is capable of a high degree of linearity of detection. This is because the reference signal is at all times larger than the signal to be measured, with the result that the detector is at all times biased into the linear region. Conventional means, on the other hand, which simply rectify the signal and do not have the A.C. reference signal available are non-linear, the result is that the present method is inherently able to operate over a larger dynamic range than a method which uses signal rectification.

The above described technique of the adding together in a phase coherent detector of the nuclear magnetism signal with a CW reference signal at substantially the same frequency is seen to be useful in determining the variation of the nuclear magnetism intensity with time. It should be noted that the same technique also lends itself to determining with very great accuracy the frequency of the nuclear magnetism signal, and thereby the magnetic field in which the nuclear magnetism is precessing. Thus we have in the apparatus of the present invention the essential elements of a high accuracy magnetometer.

To employ the apparatus of the present invention as a magnetometer one operates with the same sequence of steps as depicted in FIG. 4a through 4d. If the precession frequency is exactly equal to the reference frequency one obtains the simple exponential decay curve as shown in FIG. 4d. If however the precession frequency is slightly different from the reference frequency one obtains beats as in FIG. 7c. The beat frequency gives the magnitude of the correction to be applied to the reference frequency to obtain the precession frequency. In order to determine whether the correction is positive or negative, since this is not evident without some further step, one could purposely shift the reference frequency and observe its effect on the beat frequency. For example, if the beat frequency is found to be 1 cps, and if a slight increase in the reference frequency changes this to 2 cps, then one knows that the original reference frequency was on the high side of the precession frequency, and accordingly the precession frequency is found to be equal to the accurately known reference frequency minus 1 cps. Alternatively one could determine whether the correction is a positive or negative correction by measuring a quadrature signal with appropriate phase detection means.

In using the equipment of this invention as a magnetometer a preferred embodiment would involve the use of a sample of known material, say water, inserted within the detector coil of the apparatus. This sample by reason of better filling factor would give a stronger signal than would the hydrogen nuclei of the surrounding earth material. FIG. 9a shows the equipment for a magnetometer, generally like the apparatus of FIGS. 1–3, except for the provision of the sample S of known material inserted within the detector coil 23. The objective with this equipment is to obtain an accurate measure of the beat frequency, as discussed above, and this is obtained as follows, referring to FIG. 9a. It will also be noted that the multichannel digital boxcar integrator 36a discussed elsewhere herein is illustrated as part of the system in FIG. 9a in place of the simple boxcar integrator 36 of FIG. 3. The apparatus of FIG. 9a is the same as that of FIG. 3, except for the substitution of the multichannel digital boxcar integrator 36a for the simple boxcar integrator 36 and except for the insertion of the sample S in a suitable holder within the detector coil 23. Furthermore, it is assumed in the operation illustrated in FIG. 9a that the reference signal has a slightly different frequency from the nuclear precession signal with the result, as shown, that beats appear in the output, whereas in the operation illustrated in FIG. 3, these frequencies were assumed equal. In FIG. 9a the nuclear magnetism signal passing from the Signal Amplifier 41 to the Phase Coherent Detector 42 would have the form as shown at that point in the figure. The decaying trailing edge of that signal is shown in greater enlargement in examples at 9b and 9c, each example representing the signal developed by one pulsing of the apparatus. The signal at 9b shows the audiofrequency (approximately 2 kc) wave exhibiting the beats which result from the slight difference between the reference and precession frequencies and at the same time decreasing roughly according to an overall exponentially decaying envelope. The actual signal envelope does not follow the exponential envelope closely but only roughly because of the presence of noise along with the desired signal. At 9c we see again the beats and a different rough approximation to the exponential. The Phase Coherent Detector puts out the signal shown at 9d when that at 9b is fed into it, and it puts out the signal at 9e when that at 9c is fed in. Signals such as 9d and 9e may be viewed continuously on the cathode ray oscilloscope 44 indicated, thus permitting a visual or a photographic average to be taken which would resemble the signal shown at 9f. For more exact measurement, however, all the signals such as 9d, 9e, etc. would be fed into the multichannel digital boxcar integrator 36a, which in turn would average out the noise and present to the Recorder 17 the final signal shown at 9f. The number of beats per second as measured at the C.R.O. 44 or at the Recorder 17 thus provides the correction which is to be applied to the known reference frequency of the Audio Oscillator 38 to obtain the nuclear precession frequency of the sample S material in the earth's field. This frequency may then be converted to a magnetic field value in the well known way in the art of nuclear magnetic precession magnetometers, for example, as discussed above with reference to the Varian U.S. Pat. No. Re. 23,769.

I claim:

1. In a method of geophysical exploration in bore holes drilled into the earth the steps of: subjecting a region including earth material in situ to a relatively strong D.C. magnetic field, for polarizing susceptible nuclei in said material including selected nuclei therein; applying an alternating magnetic field in the same region including polarized nuclei therein in a direction transverse to the earth's magnetic field and at a frequency corresponding to the Larmor precession frequency of the selected nuclei in the earth's field; while said alternating field is being applied, terminating the D.C. polarizing field in said region including said material adiabatically within a predetermined time interval such that the D.C. field is terminated within a time interval less than the characteristic thermal relaxation time of the selected nuclei, thereby sweeping the selected nuclei onto driven resonance in the alternating field; then abruptly terminating the alternating field in said region including said polarized nuclei so that the selected polarized nuclei precess freely about the earth's magnetic field in said region; and, detecting a characteristic of the resulting free precession condition of the selected nuclei.

2. A well logging system for geophysical exploration in bore holes drilled into the earth comprising a well logging instrument adapted to be passed through the bore hole, said instrument including means for subjecting a region including earth material in situ to a relatively strong D.C. magnetic field, for polarizing susceptible nuclei in said material including selected nuclei therein; means for applying an alternating magnetic field in the same region including polarized nuclei therein in a direction transverse to the earth's magnetic field and at a frequency corresponding to the Larmor precession frequency of the selected nuclei in the earth's field; said system including means for terminating the D.C. polarizing field in said region including said material adiabatically while said alternating field is being applied and within a predetermined time interval such that the D.C. field is terminated within a time interval less than the characteristic thermal relaxation time of the selected nuclei, thereby sweeping the selected nuclei onto driven resonance in the alternating field; said system further including means for then abruptly terminating the alternating field in said region including polarized nuclei so that the selected polarized nuclei precess freely about the earth's magnetic field in said region; and, means for detecting a characteristic of the resulting free precession condition of the selected nuclei.

3. Apparatus as defined in claim 2 wherein the means for applying the alternating field in the region including said polarized nuclei includes: a source of alternating current oscillations coupled to a coil in said logging instrument; and wherein said means for detecting a characteristic of the resulting free precession condition of the selected nuclei further includes a phase coherent detector coupled to said source of oscillations for deriving therefrom a reference signal in timed correlation with the alternating field applied to said region.

4. Apparatus as defined in claim 3 further comprising a transient integrating type signal enhancement system coupled to the output of said phase coherent detector.

5. Apparatus as defined in claim 3 further comprising magnetometer apparatus including a magnetometer head associated with said well logging instrument for measuring the value of the earth's magnetic field in said bore hole, said logging system further comprising means coupled to said magnetometer for controlling the frequency of said source of alternating current oscillations in response to the value of the earth's field in the vicinity of said logging instrument so that said alternating magnetic field applied to the region under investigation is maintained substantially at the Larmor precession frequency of the selected nuclei in the earth's field from place to place throughout the bore hole.

6. Apparatus as defined in claim 5 wherein said magnetometer is of the magnetic resonance type and which includes a magnetometer oscillator whose output frequency is maintained substantially at the Larmor frequency for selected nuclei contained in a preselected sample of material positioned in said magnetometer head and subjected to the earth's magnetic field in said bore hole.

7. A well logging system for geophysical exploration in bore holes drilled into the earth comprising a well logging instrument adapted to be passed through the bore hole, said instrument including means for subjecting material to a relatively strong D.C. magnetic field for polarizing susceptible nuclei therein; means for applying an alternating magnetic field to said material including polarized nuclei therein in a direction transverse to the earth's magnetic field and at a frequency corresponding substantially to the Larmor precession frequency of the selected nuclei in the earth's field; said system including means for terminating the D.C. polarizing field applied to said material adiabatically while said alternating field is being applied and within a time interval less than the characteristic thermal relaxation time of the selected nuclei, thereby sweeping the selected nuclei onto driven resonance in the alternating field; said system further including means for then abruptly terminating the alternating field applied to said material including said polarized nuclei so that the selected polarized nuclei precess freely about the earth's magnetic field in said material; and means for detecting a characteristic of the resulting free precession condition of the selected nuclei.

8. Apparatus as defined in claim 7 wherein said material is included in earth formations in situ along the borehole.

9. Apparatus as defined in claim 7 wherein said material comprises a preselected sample contained within said logging instrument, and wherein means are provided for deriving a signal indicative of the precise value of the Larmor frequency of the nuclei in free precession, thereby providing a measure of the earth's field applied to said sample in the logging instrument.

10. Apparatus as defined in claim 2 wherein said means for detecting a characteristic of the resulting free precession condition of the selected nuclei includes a transient integrating signal enhancement system.

11. Apparatus as defined in claim 4 wherein said transient integrating signal enhancement system includes an analog boxcar integrator.

12. Apparatus as defined in claim 10 wherein said transient integrating signal enhancement system includes an analog boxcar integrator.

13. Apparatus as defined in claim 4 wherein said transient integrating signal enhancement system includes a digital boxcar integrator.

14. Apparatus as defined in claim 10 wherein said transient integrating signal enhancement system includes a digital boxcar integrator.

15. Apparatus as defined in claim 4 wherein said transient integrating signal enhancement system includes a multi-channel computer of average transients.

16. Apparatus as defined in claim 10 where said transient integrating signal enhancement system includes a multi-channel computer of average transients.

17. A well logging system for geophysical exploration in boreholes drilled into the earth comprising a well logging instrument adapted to be passed through the borehole, said instrument including means for subjecting a region including earth material in situ to a relatively strong D.C. magnetic field, for polarizing susceptible nuclei in said material including selected nuclei therein; said system including means for terminating the D.C. polarizing field in said region including said material adiabatically within a predetermined time interval such that the D.C. field is terminated within a time interval less than the characteristic thermal relaxation time of the selected nuclei; means for applying an alternating field in the same region including polarized nuclei therein in a direction transverse to the earth's magnetic field and at a frequency corresponding to the Larmor precession frequency of the selected nuclei in the earth's field; said system further including means for then abruptly terminating the alternating field in said region including said polarized nuclei so that the selected polarized nuclei precess freely about the earth's magnetic field in said region; and, means comprising a phase coherent mixer for detecting a characteristic of the resulting free precession condition of the selected nuclei, said phase coherent mixer including means for deriving a reference signal in timed correlation with the alternating field applied to said region.

18. In a method of geophysical exploration in boreholes drilled into the earth the steps of: subjecting a region including earth material in situ to a relatively strong D.C. magnetic field, for polarizing susceptible nuclei in said material including selected nuclei therein; terminating the D.C. polarizing field in said region including said material adiabatically within a predetermined time interval such that the D.C. field is terminated within a time interval less than the characteristic thermal relaxation time of the selected nuclei; applying an alternating magnetic field in the same region including polarized nuclei therein in a direction transverse to the earth's magnetic field and at a frequency corresponding to the Larmor precession frequency of the selected nuclei in the earth's field; then abruptly terminating the alternating field in said region including said polarized nuclei so that the selected polarized nuclei precess freely about the earth's magnetic field in said region; and, detecting a characteristic of the resulting free precession condition of the selected nuclei by deriving a signal corresponding to the detected characteristic by deriving a reference signal in timed correlation with the alternating field applied to said region and subjecting the derived signal to phase coherent mixing.

19. Apparatus as defined in claim 17 wherein said means for detecting a characteristic of the resulting free precession condition of the selected nuclei includes a transient integrating signal enhancement system.

20. Apparatus as defined in claim 19 wherein said transient integrating signal enhancement system includes an analog boxcar integrator.

21. Apparatus as defined in claim 19 wherein said transient integrating signal enhancement system includes a digital boxcar integrator.

22. Apparatus as defined in claim 19 wherein said transient integrating signal enhancement system includes a multi-channel computer of average transients.

23. A well logging system as defined in claim 2 wherein the means for subjecting said region in situ to a relatively strong D.C. magnetic field includes first coil means, and wherein the means for detecting a characteristic of the resulting free precession condition includes second coil means.

24. A well logging system as defined in claim 7 wherein the means for subjecting said material to a relatively strong D.C. magnetic field includes first coil means and wherein the means for detecting a characteristic of the resulting free precession condition includes second coil means.

25. A well logging system as defined in claim 17 wherein the means for subjecting said region in situ to a relatively strong D.C. magnetic field includes first coil means, and wherein the means for detecting a characteristic of the resulting free precession condition includes second coil means.

26. A well logging system as defined in claim 23 wherein the means for applying an alternating field in the same region includes third coil means.

27. A well logging system as defined in claim 24 wherein the means for applying an alternating field to said material includes third coil means 28. A well logging system as defined in claim 25 wherein the means for applying an alternating field to said material includes third coil means.

* * * * *

PO-1050
(5/69)

UNITED STATES PATENT OFFICE
CERTIFICATE OF CORRECTION

Patent No. 3,667,035  Dated May 30, 1972

Inventor(s) Charles P. Slichter

It is certified that error appears in the above-identified patent and that said Letters Patent are hereby corrected as shown below:

Col. 3, line 16, "urface" should be --surface--.
Col. 7, lines 24-25, "assuming sufficient time is allowed after each infinitesimal change in $\Theta$ to permit realignment" should be italicized.
Col. 11, line 18, delete "c" after "slow-turn-off".
Col. 11, line 55, "$H_0$" should read --$H_0$'--.
Col. 11, line 65, "$H_0$" should read --$H_0$'--.
Col. 12, line 40, "$H_{01}$" should read --$H_0$'--.

Signed and sealed this 8th day of January 1974.

(SEAL)
Attest:

EDWARD M. FLETCHER, JR.　　　RENE D. TEGTMEYER
Attesting Officer　　　　　　　Acting Commissioner of Patents